United States Patent
Uchida et al.

[19]

[11] Patent Number: 5,884,165
[45] Date of Patent: Mar. 16, 1999

[54] MOBILE COMMUNICATION SYSTEMS SHARING A CONTROL CHANNEL

[75] Inventors: Noriko Uchida; Akihiro Maebara; Katsumi Kobayashi, all of Yokohama; Koji Yamamoto, Sayama; Syoichi Hirata, Higashiyamato; Kazuo Sugiyama, Ichikawa; Masumi Sotoyama, Yachiyo; Koji Sasada, Tokyo, all of Japan

[73] Assignee: NTT Mobile Communications Network, Inc., Japan

[21] Appl. No.: 601,063

[22] PCT Filed: Oct. 9, 1995

[86] PCT No.: PCT/JP95/02066

§ 371 Date: May 7, 1996

§ 102(e) Date: May 7, 1996

[87] PCT Pub. No.: WO96/11552

PCT Pub. Date: Apr. 18, 1996

[30] Foreign Application Priority Data

Oct. 11, 1994 [JP] Japan ................................ 6-245519
Dec. 22, 1994 [JP] Japan ................................ 6-320166
Dec. 22, 1994 [JP] Japan ................................ 6-320167

[51] Int. Cl.$^6$ .............................. H04B 7/26; H04Q 7/20
[52] U.S. Cl. ......................... 455/426; 455/434; 455/515
[58] Field of Search ................................ 455/426, 432, 455/434, 443, 444, 448, 507, 509, 510, 513, 515, 552, 553, 435, 525, 511, 454; 379/58–60

[56] References Cited

U.S. PATENT DOCUMENTS

| | | | |
|---|---|---|---|
| 4,775,999 | 10/1988 | Williams ................................ | 455/535 |
| 4,887,265 | 12/1989 | Felix . | |
| 5,093,926 | 3/1992 | Sasuta ................................ | 455/432 |
| 5,123,110 | 6/1992 | Grube ................................ | 455/525 |
| 5,179,721 | 1/1993 | Comroe et al. ................ | 455/67.1 |
| 5,301,359 | 4/1994 | Van Den Heuvel .............. | 455/552 |
| 5,353,332 | 10/1994 | Raith et al. ........................ | 379/59 |
| 5,499,386 | 3/1996 | Karlsson ............................ | 455/525 |
| 5,586,338 | 12/1996 | Lynch et al. ...................... | 455/525 |
| 5,613,204 | 3/1997 | Haberman et al. ............... | 455/432 |

FOREIGN PATENT DOCUMENTS

A-49-131306  12/1949  Japan .

OTHER PUBLICATIONS

International Search Report PCT/JP95/02066.
Partial English translation of JP–A–49–131306.

Primary Examiner—Reinhard J. Eisenzopf
Assistant Examiner—Lester G. Kincaid
Attorney, Agent, or Firm—Rogers & Wells LLP

[57] ABSTRACT

In a mobile communication system, a data communication fixed station 3 and a voice communication fixed station 4 control a common service area, the connection between a mobile station 5 and the data communication fixed station 3 can be quickened. The data communication fixed station 3 notifies, sequentially, the voice communication fixed station 4 of channel informations (e.g., usable channels, traffic quantity). The voice communication fixed station 4 receives the channel information via a broadcast channel for voice communication, and broadcasts the channel information to the mobile stations. When the mobile station 5 is to execute packet communication with an ISDN 1 via the data communication fixed station 3, the mobile station 5 selects an appropriate channel among the channels broadcasted thereto, and notifies the data communication fixed station 3 of the selected channel. As such, since the mobile station 5 can determine the channel before the actual communication between the mobile station 5 and the data communication fixed station 3 takes place, the connection between the mobile station 5 and the data communication fixed station 3 can be quickened.

15 Claims, 30 Drawing Sheets

FIG.9A
CHANNEL CORRESPONDING INFORMATION

| NUMBER OF ZONES (m) |
|---|
| ZONE #1 |
| LEVEL MEASURING CHANNEL #1 |
| NUMBER OF CHANNELS (n1) |
| FIXED STATION 3 CHANNEL #1 |
| ⋮ |
| FIXED STATION 3 CHANNEL #n1 |
| ... |
| ZONE #m |
| LEVEL MEASURING CHANNEL #m |
| NUMBER OF CHANNELS (nm) |
| ⋮ |
| OTHER FIXED STATION CHANNEL #1 |
| OTHER FIXED STATION CHANNEL #nm |

FIG.9B
TRAFFIC CHANNEL INFORMATION

| NUMBER OF CHANNELS (p) |
|---|
| FIXED STATION 3 CHANNEL #1 |
| ... |
| FIXED STATION 3 CHANNEL #p |

FIG.9C
PERIPHERAL ZONE INFORMATION

| NUMBER OF ZONES (i) |
|---|
| ZONE #1 |
| LEVEL MEASURING CHANNEL #1 |
| ZONE #2 |
| LEVEL MEASURING CHANNEL #2 |
| ... |
| ZONE #i |
| LEVEL MEASURING CHANNEL #i |

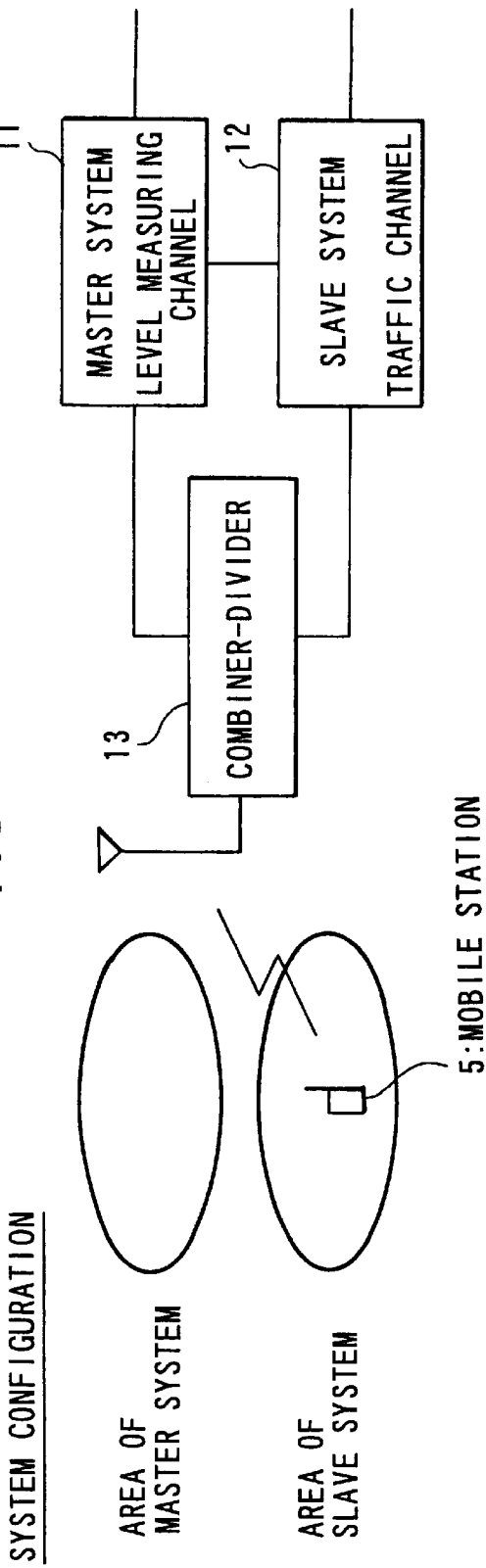
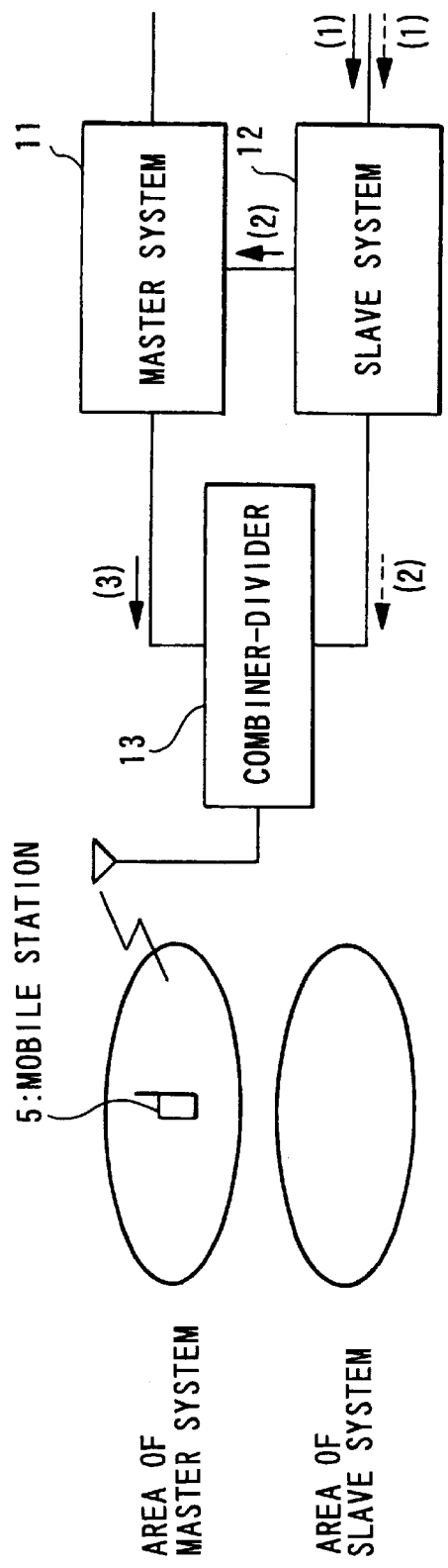

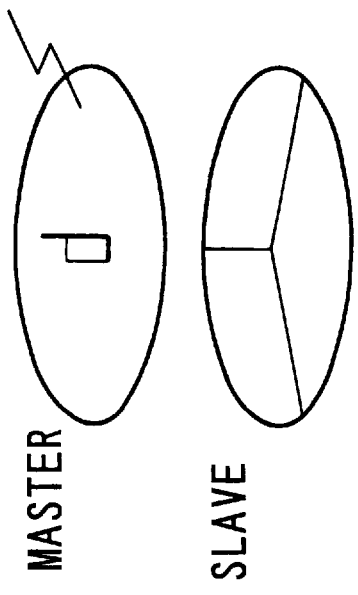
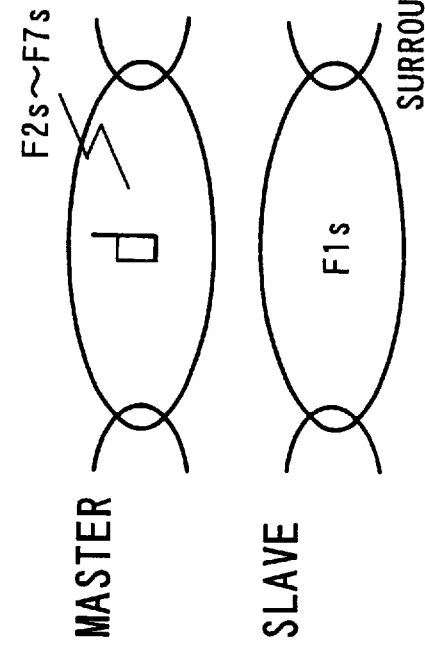
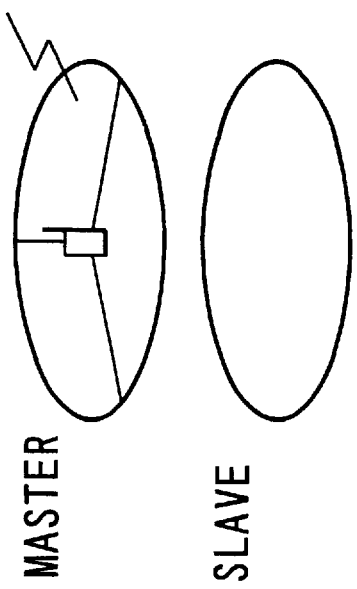
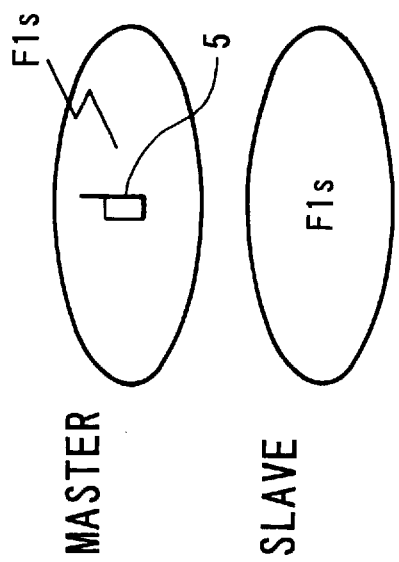

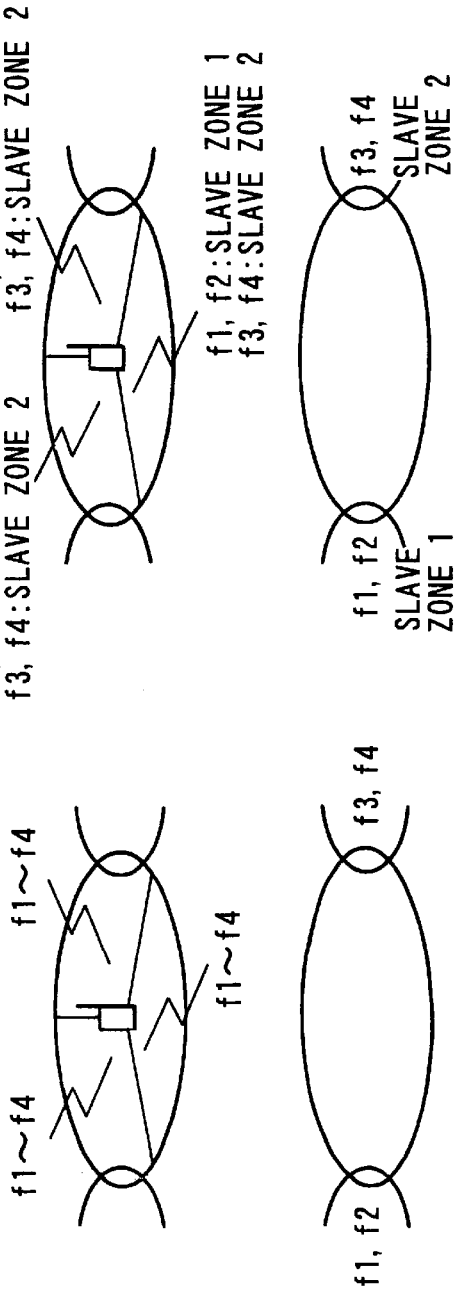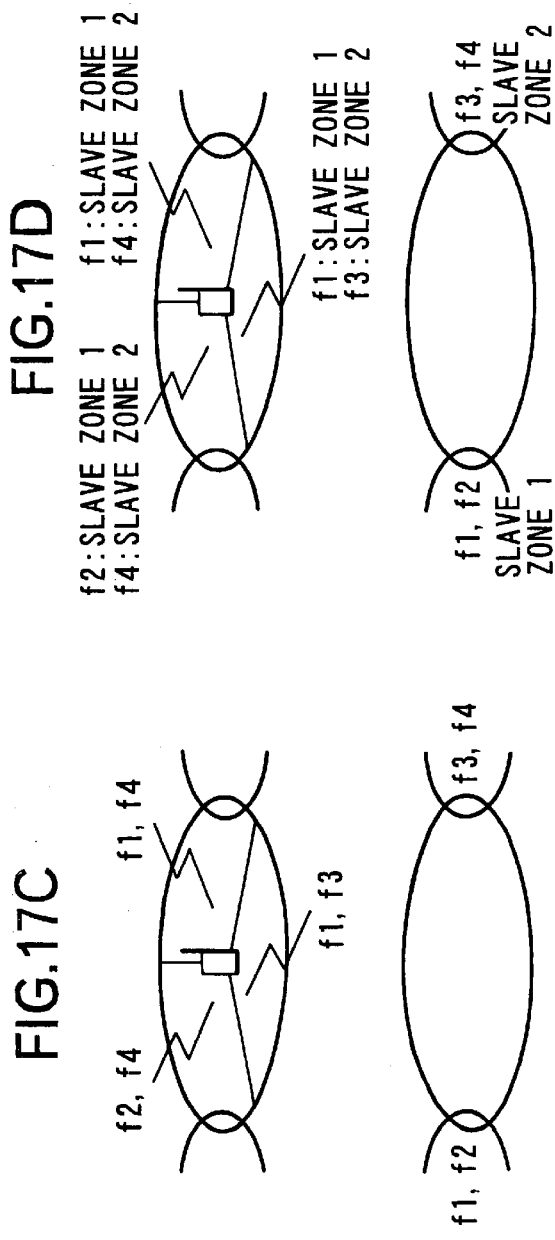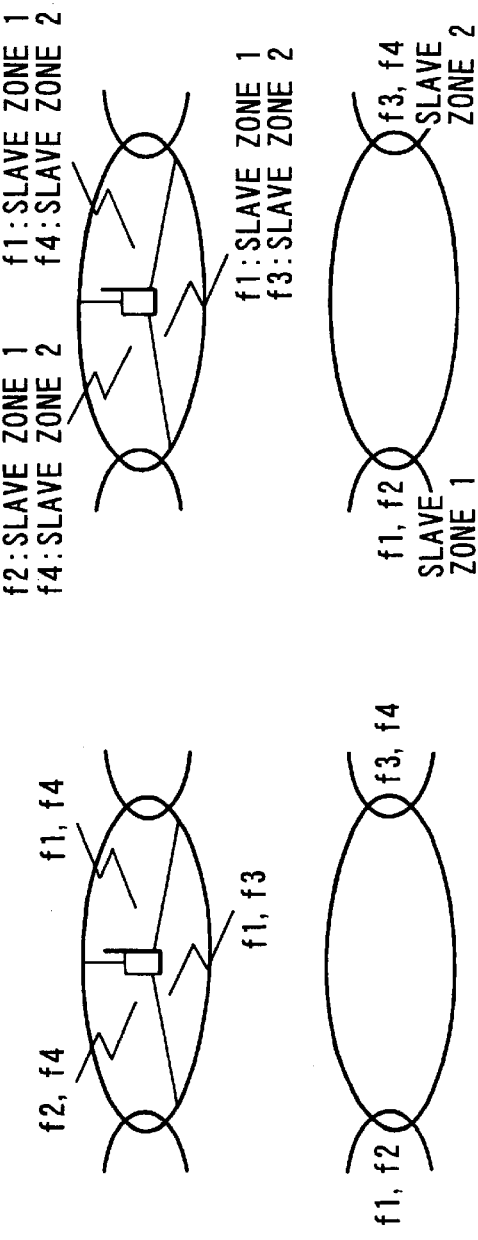

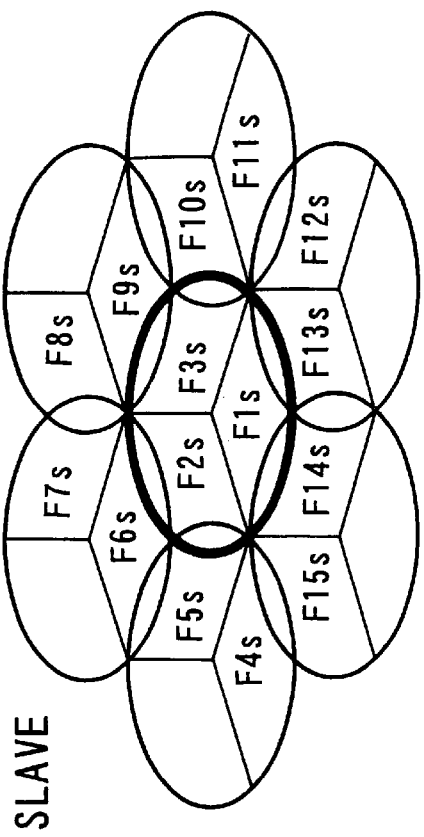
FIG.18A MASTER
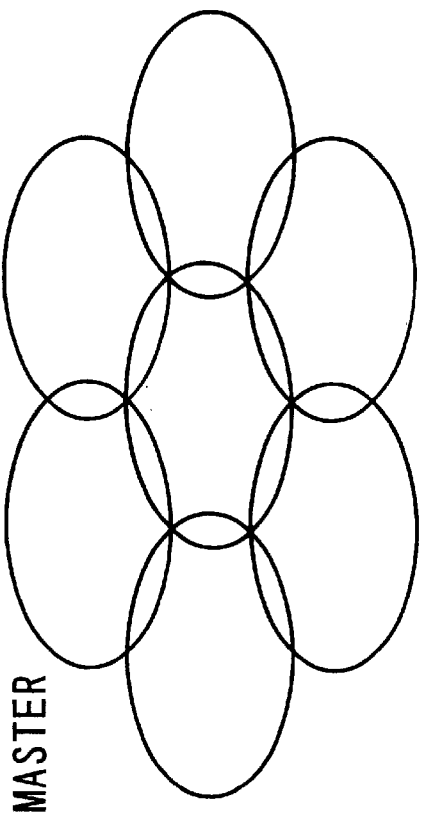
FIG.18B SLAVE
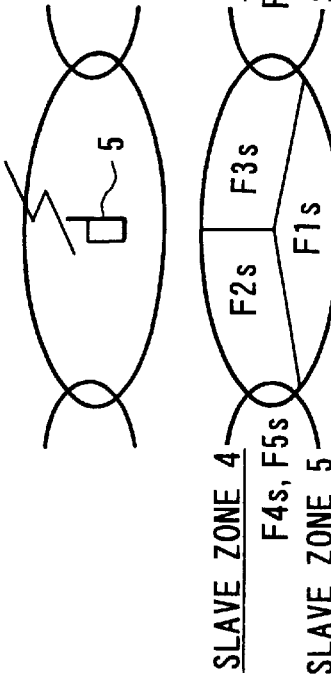
FIG.19A
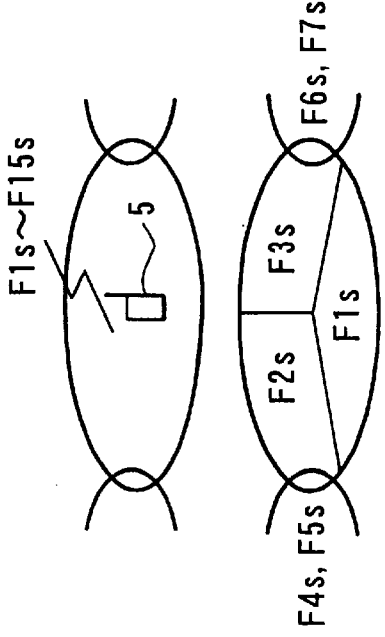
FIG.19B

MASTER

SLAVE

MASTER

F2m~F11m

SLAVE

F1m~F3m:SLAVE ZONE 1
F15m

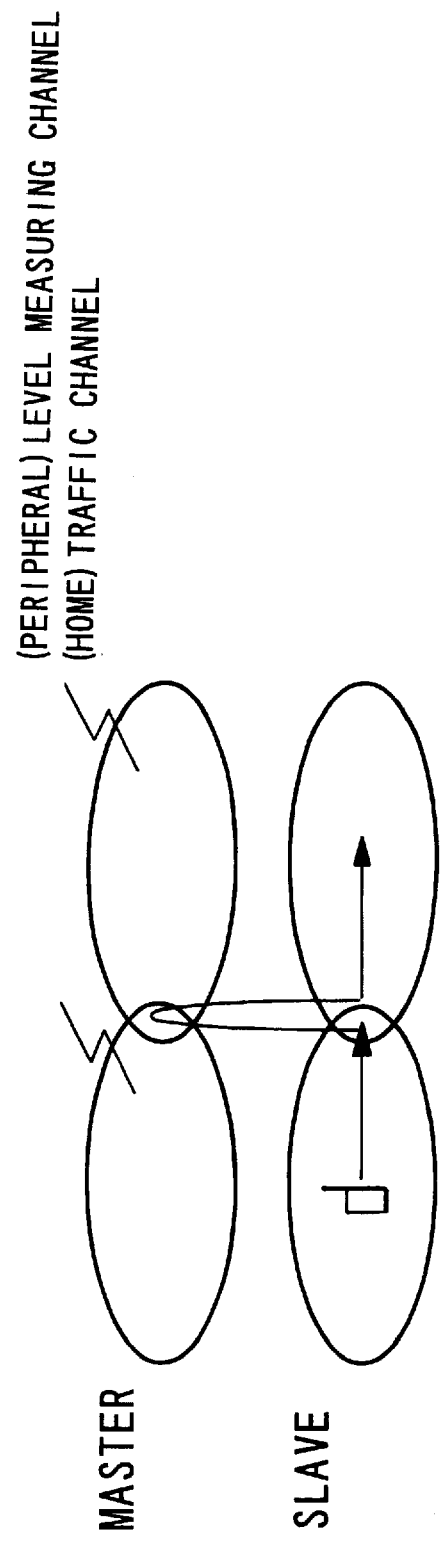
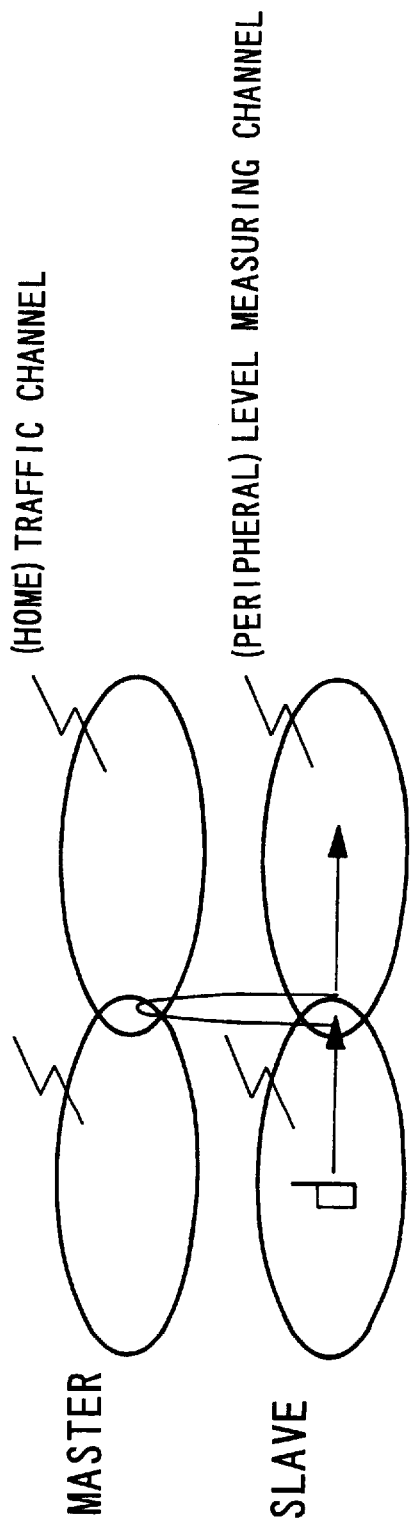

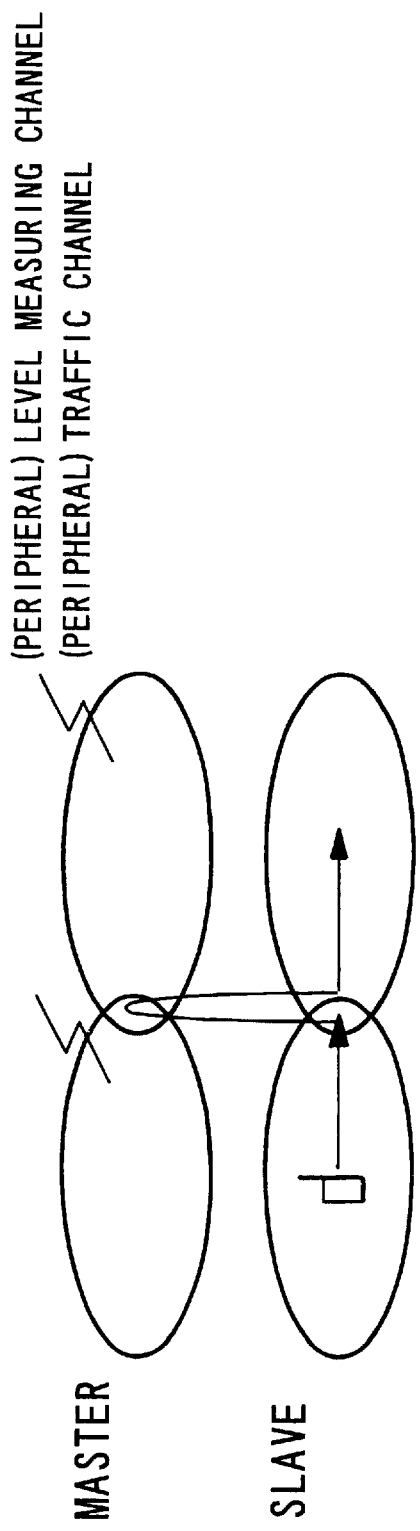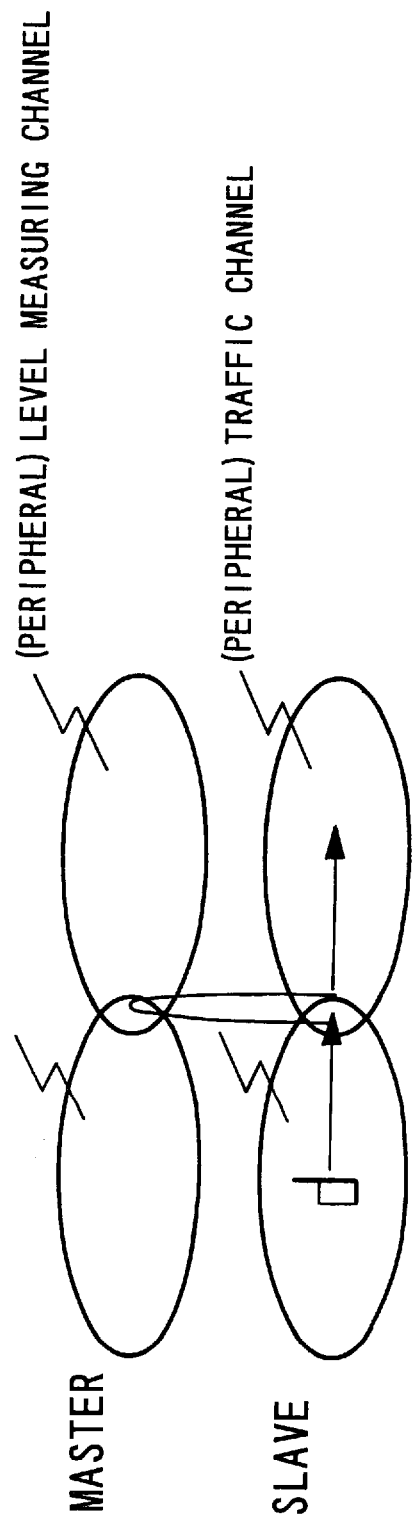

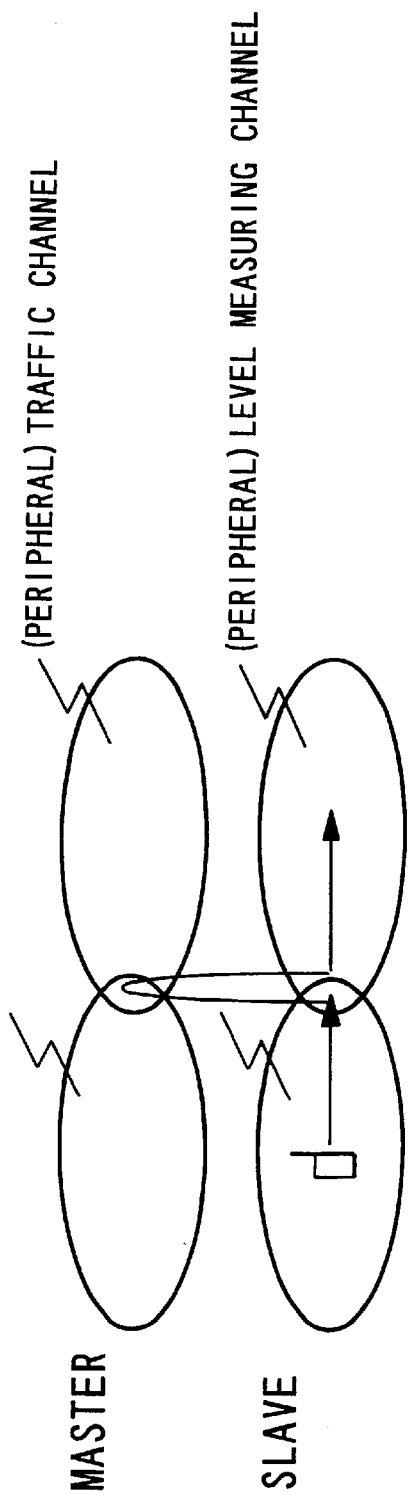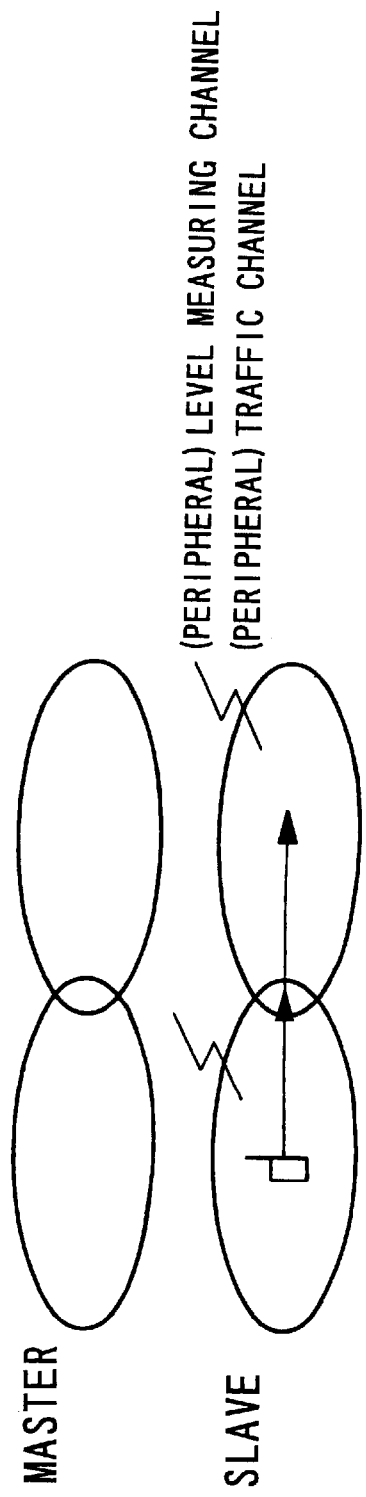

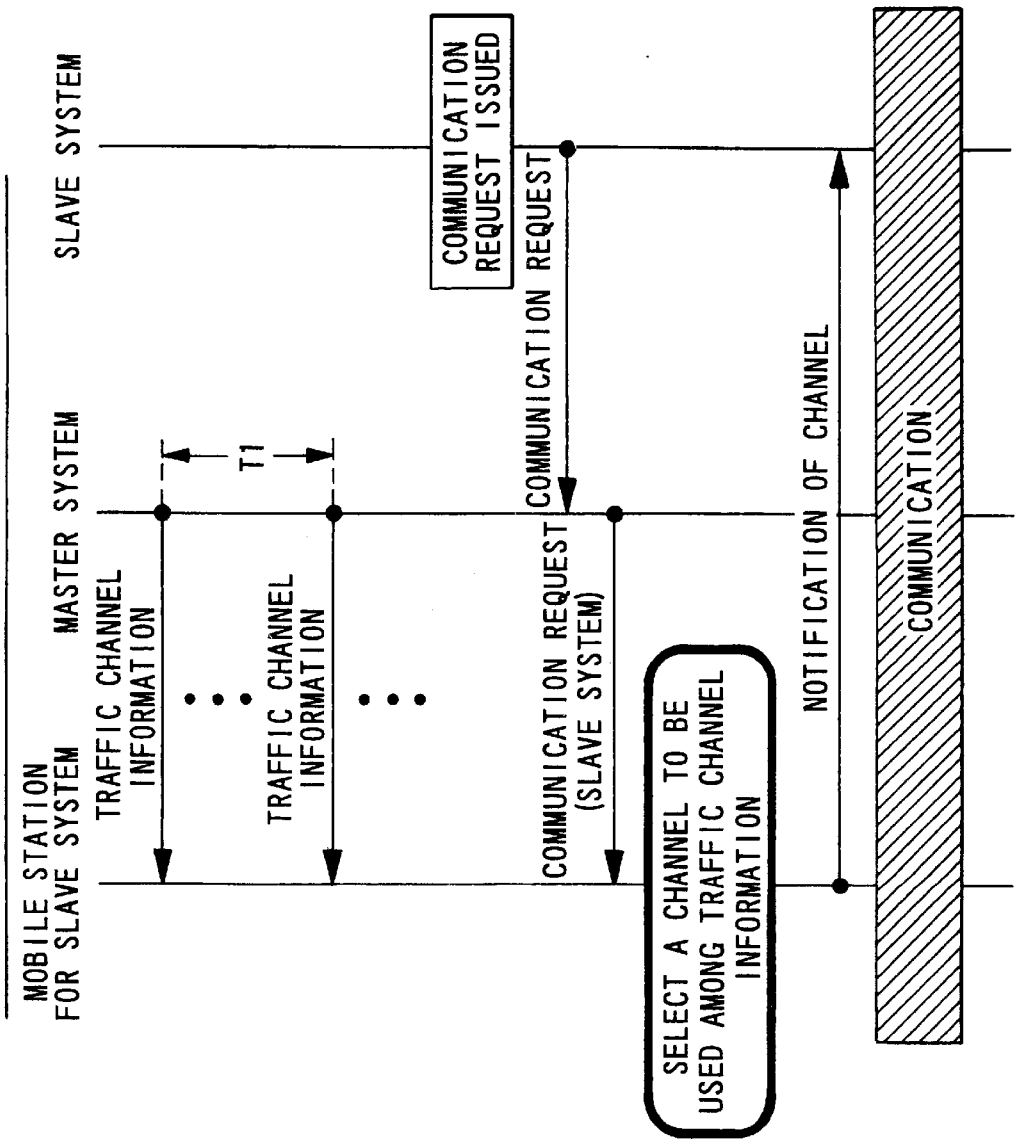

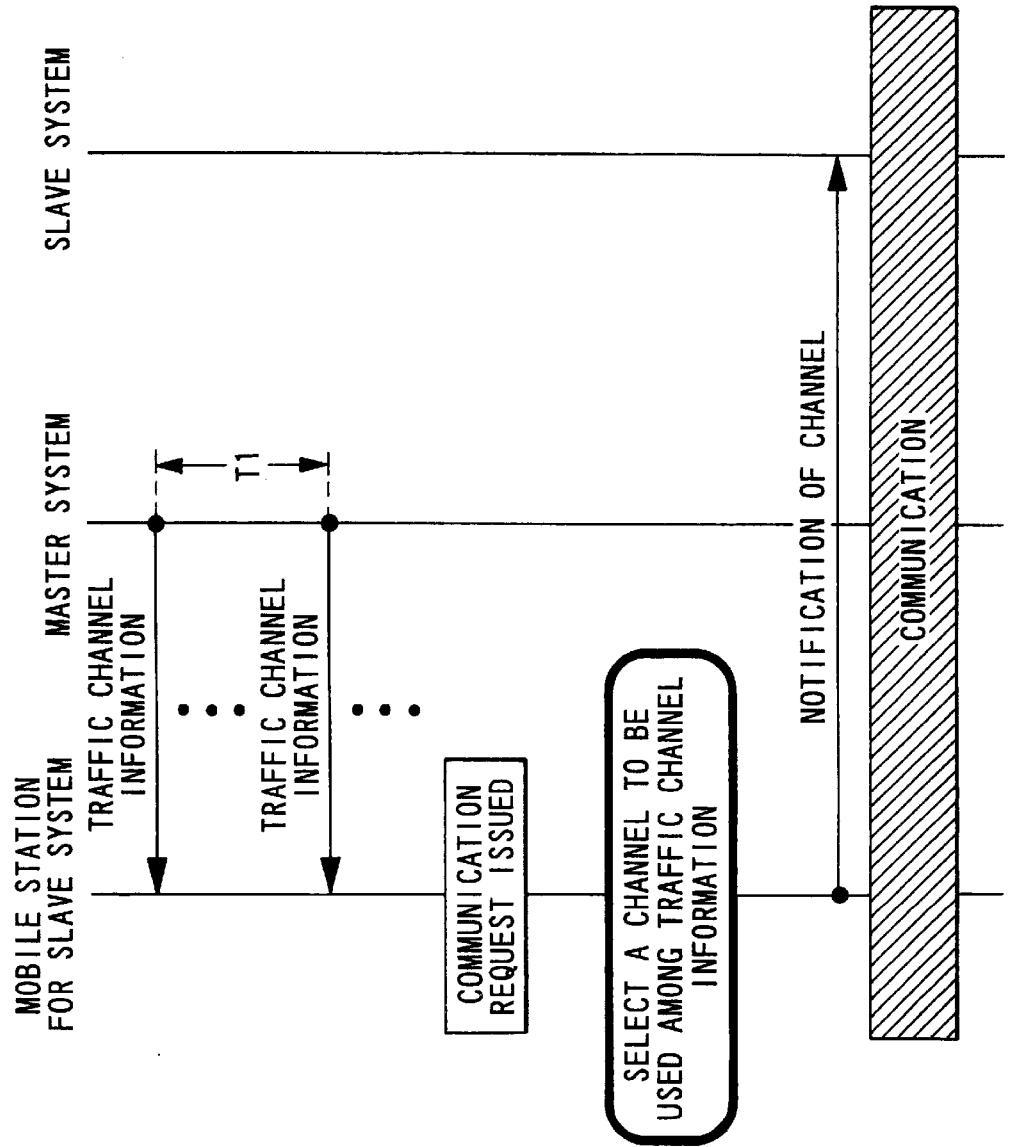

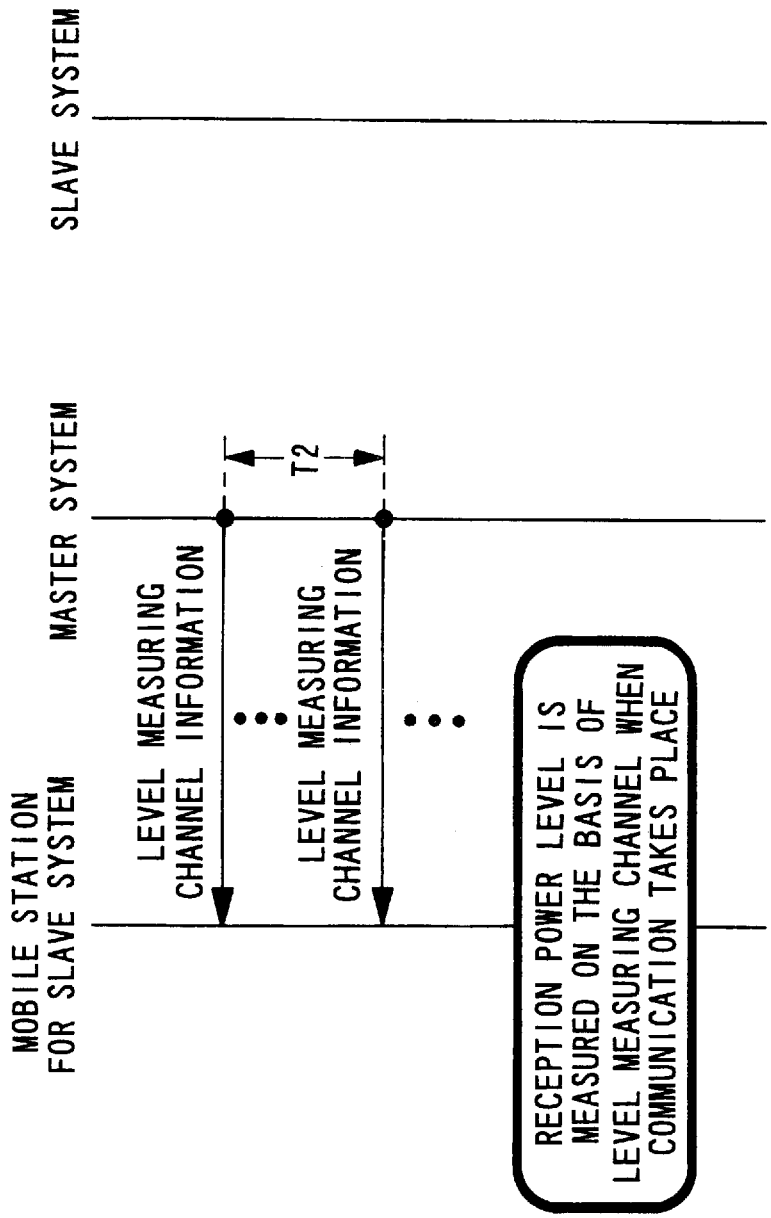

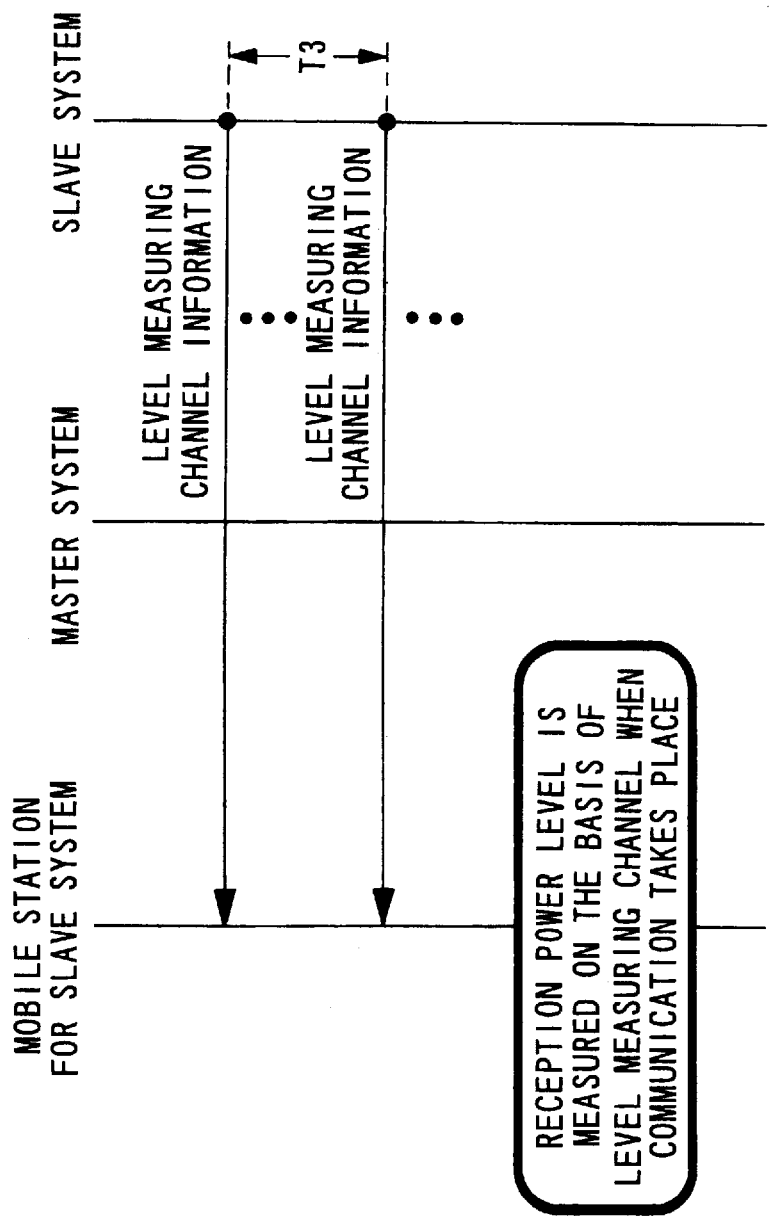

MOBILE COMMUNICATION SYSTEMS SHARING A CONTROL CHANNEL

TECHNICAL FIELD

The present invention relates to a method for communication in a mobile communication system and mobile stations, wherein the mobile communication system includes a plurality of systems for controlling identical areas, and the mobile stations in the areas communicate with the systems.

BACKGROUND ART

Recently, it has been shown that a mobile communication system may include a plurality of systems for covering identical service areas. For example, a TDMA voice communication system for transmitting voice signals and a TDMA packet communication system for data communication may be provided for the identical service areas. If the plurality of systems are provided for the identical areas in the conventional mobile communication system, communication requests from the mobile stations are notified by the individual systems. Meanwhile, the mobile stations, which are provided with a plurality of receivers corresponding to the systems, receive communication requests from the systems individually, and enjoy communication services from the systems respectively.

As described above, if the mobile station in the conventional mobile communication system is to enjoy communication services from the plurality of systems, the mobile station may by provided with a plurality of receivers corresponding to the systems so as to receive communication requests from the systems, simultaneously. Such a situation is problematical by causing difficulty of miniaturization of the mobile station, and by causing enlargement of power consumption.

The problems described above may occur similarly concerning the level measuring channels utilized for the plurality of systems. The details are the following. A fixed station, in a mobile communication system coming under the minimum zone structure TDMA system, is generally provided with a level measuring channel having a constant transmission power in all slots. The mobile station measures reception field levels of a plurality of level measuring channels and visits the zone corresponding to the channel having the highest electrical field power level.

Incidentally, it is difficult to determine the zone to be visited by measuring electrical field power levels of ordinary traffic channels in place of the level measuring channel. The reason is that transmission power control for varying transmission power is executed, with respect to every mobile station (i.e., every TDMA slot), in order to reduce interference with other zones, so that the zone cannot be determined simply by the reception field levels of the traffic channels.

However, since the master and slave systems are provided with independent level measuring channels in the conventional technique, which causes difficulty such as miniaturization of the mobile station and enlargement of power consumption. Furthermore, communication quality is reduced due to increasing of interference for traffic channels in other zones, the channels having the same frequency of the level measuring channel.

DISCLOSURE OF INVENTION

It is accordingly, a first object of the present invention to miniaturize mobile stations enjoying communication services from the plurality of systems. Furthermore, a second object of the present invention is to provide a mobile station which can enjoy communication services from the plurality of systems without a plurality of receivers corresponding to the systems.

Furthermore, a third object of the present invention is to provide a fixed station system, for mobile communications, in which a plurality of systems share a level measuring channel. Furthermore, a fourth object of the present invention is to provide a mobile station suited for the fixed station system.

There may be a technique for achieving the objects, in which one of the systems (e.g., a TDMA voice communication system) is regarded as a "master system" and others (e.g., a TDMA packet communication system) as "slave systems." More specifically, the communication request for the mobile station issued in the slave systems is transmitted to the mobile station via the master system. Consequently, the mobile station in the uncommunicative state can receive all the communication requests even from the slave systems by receiving signals only from the master system.

However, according to the configuration described above, there is a possibility of taking a long duration, from the time when the communication request concerning the slave system is transmitted to the mobile station via the master system, until the time when the mobile station and the slave system actually start communication. The reason is that the mobile station scans candidates (which are stored previously in a ROM in the mobile station) for the traffic channel concerning the slave system, specifies the traffic channel having the highest reception field level, and executes communication via the specified traffic channel. As such, since the technique merely regarding a system as the "master system" takes a long duration until the channel is selected, the communication quality may be lowered by increasing connection delays, increasing non-communication periods, etc.

It is accordingly, a fifth object of the present invention to start, immediately, the communication in the mobile station.

In order to achieve the objects described above, in a first aspect of the present invention, there is provided a mobile communication system comprising:

a master system provided with a control channel for controlling a prespecified service area; and at least one slave system for controlling the service area identical with the service area of the master system, and for utilizing the control channel.

The control channel can be embodied by a channel required for the mobile station communicating with the slave system, and by a level measuring channel utilized for zone judgment.

The present invention can be embodied by a method of communication utilized in a mobile communication system comprising a plurality of systems for controlling identical service areas, the systems are communicable with a mobile station in the area, the improvement comprising steps of:

specifying any of the system to be a master system;

transferring, to the master system from any of the systems with the exception of the master system, a communication request for the mobile station when the communication request is issued;

receiving, by the master system, the communication request transferred by any of the systems with the exception of the master system;

executing, by the master system, an information conversion of the communication request so as to identify the system being issued the communication request;

broadcasting, to the mobile station from the master system, the communication request being executed by the information conversion;

selecting, by the mobile station, a communication means corresponding to the master system among a plurality of communication means which are Provided previously, when the mobile station does not communicate with any system;

identifying, by the mobile station, a system in which the communication request is issued, when the mobile station receives the communication request being executed by the information conversion;

selecting, by the mobile station, a communication means corresponding to the identified system; and communicating, with the system by the mobile station, via the selected communication means.

In this embodiment, the information conversion is executed, for the communication request issued in any system, so as to identify the system, and the converted results are broadcasted to the mobile station via the master system. Then, the mobile station receives the communication request by means of the communication means corresponding to the master system, identifies the system in which the communication request is originated, and communicates with the system by means of the communication means corresponding to the identified system.

As such, since the mobile station communicable with a plurality of systems is possible to receive the communication request from the plurality of systems by means of a single receiver, the configuration of the mobile station can be simplified, and power consumption of the mobile station can be lowered.

Furthermore, the present invention can be embodied by a channel notification equipment comprising:

a master system for transmitting, to mobile stations visiting a prespecified service area, a first information via a level measuring channel;

a slave system for transmitting, to the mobile station, a second information via a traffic channel; and an information creating means including an information for specifying the traffic channel among the first information.

According to this embodiment, the information creating means includes the information specifying the traffic channel among the first information. Then, the first information is transmitted to the mobile station via the level measuring channel. Consequently, the mobile station receiving the level measuring channel can specify, quickly, the traffic channel.

As such, according to the channel notification equipment, since the information specifying the traffic channel can be broadcasted to the mobile station by means of the information creating means and the master system, the mobile station can determine the traffic channel before the mobile station communicates with the slave system Therefore, the mobile station and the slave system can start, immediately, the communication.

Furthermore, the present invention can be embodied by a fixed station system for mobile communication, comprising:

a master system for transmitting, to a mobile station, a first information via a first traffic channel when the mobile station is visiting a first zone; and an adjacent system provided with a level measuring channel having a constant level, for transmitting, to the mobile station, the first information when the mobile station is visiting a second zone which is adjoining the first zone;

the improvement comprising:

a slave system for transmitting, via a second traffic channel, a second information when the mobile station is visiting the first zone, and for broadcasting the level measuring channel to the mobile station.

According to this embodiment, the slave system transmits the second information to the mobile station via the second traffic channel, and broadcasts the level measuring channel to the mobile station. Therefore, the mobile station can specify the level measuring channel with ease.

Furthermore, the present invention can be embodied by a mobile station for mobile communication, comprising:

a first communication device for communicating with a master system via a first traffic channel;

an electrical field power level measuring apparatus for measuring an electrical field power level of a prespecified level measuring channel of the master system;

a second communication device for communicating with a slave system via a second traffic channel; and a level measuring information receiving means for obtaining the level measuring channel from a signal received via the second traffic channel.

According to this embodiment, the first communication device communicates with the master system via the first traffic channel, the second communication device communicates with the slave system via the second traffic channel, and the electrical field power level measuring apparatus measures electrical field power level of a prespecified level measuring channel of the master system. The level measuring information receiving means obtains the level measuring channel from the signals supplied thereto via the second traffic channel. Consequently, the mobile station can obtain the level measuring channel in the master system, even though the mobile station communicates with the second communication device.

As such, the mobile station can easily specify the level measuring channels of the visiting zone and adjacent zones, even though the communication with the master or slave system takes place. Therefore, since every system is not required for providing the level measuring channels, the number of the level measuring channels can be reduced, and high quality communications can be obtained by reducing interferences.

BRIEF DESCRIPTION OF DRAWINGS

FIGS. 9A, 9B and 9C shows various signal formats in the third embodiment.

FIG. 10 shows abstracted block diagrams of the first to third embodiments.

FIGS. 11, 12A and 12B are the explanation drawings of a protocol for broadcasting communication requests.

FIGS. 13, 14A, 14B, 15A, 15B, 17A, 17B, 17C, 17D, 18A, 18B, 19A and 19B are the explanation drawings of a protocol for broadcasting, to the mobile stations, traffic channels in the slave system.

FIGS. 38, 39, 40, 41, 42 and 43 are the explanation drawings of a zone transfer protocol at the mobile stations.

FIGS. 44 & 45 are the flowchart of the control executed when the traffic channels in the slave systems are broadcasted to the mobile stations.

FIGS. 46 & 47 are the flowchart of the control executed when the level measuring channels in the master system are broadcasted to the mobile stations.

BEST MODE FOR CARRYING OUT THE INVENTION

I. First Embodiment

Figure 1:
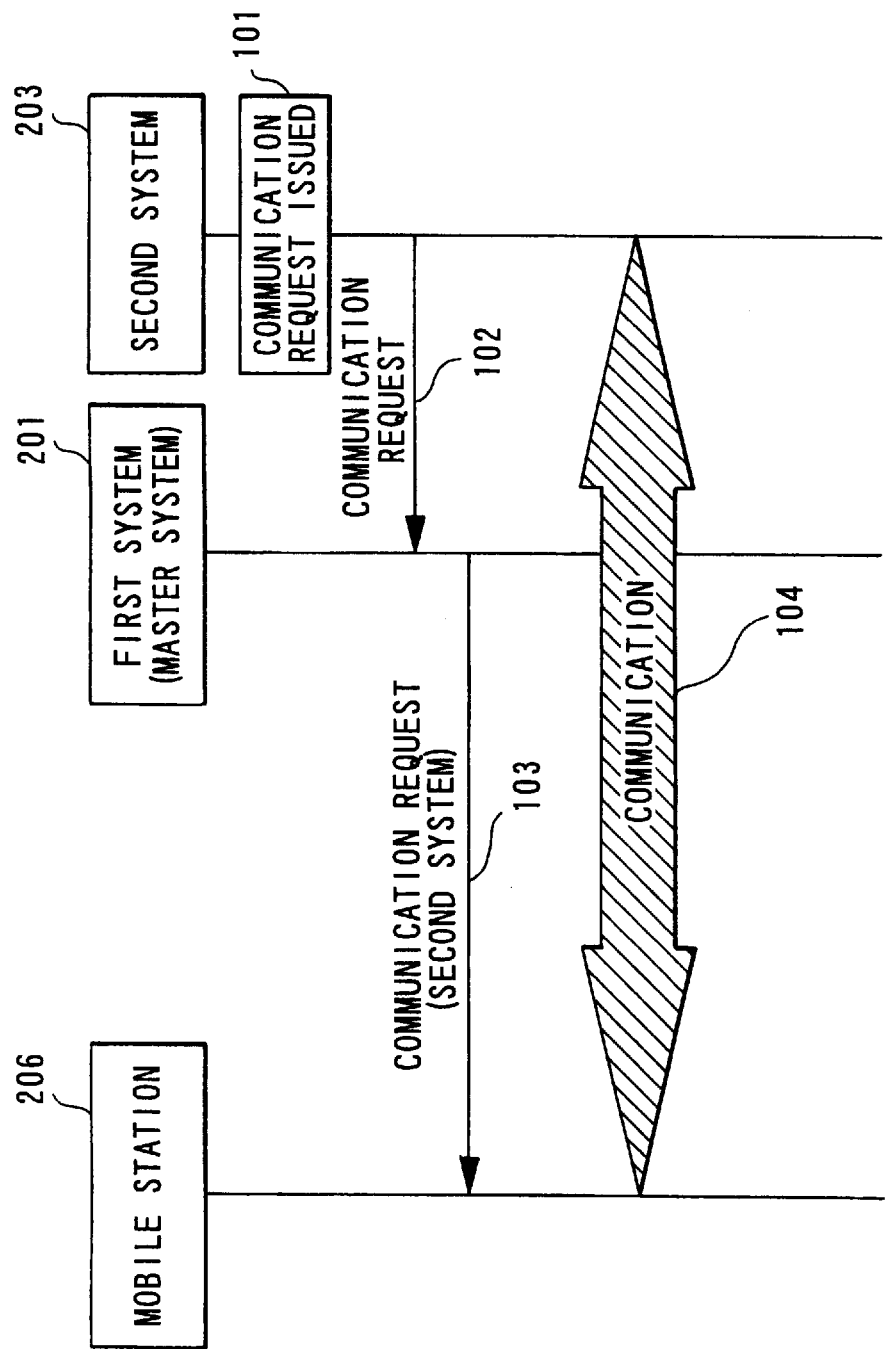
FIG. 1 shows a sequence flow of an execution process of communication according to the first embodiment of the present invention.

Next, referring to the drawings, first embodiment of the present invention will be described.

Figure 2:
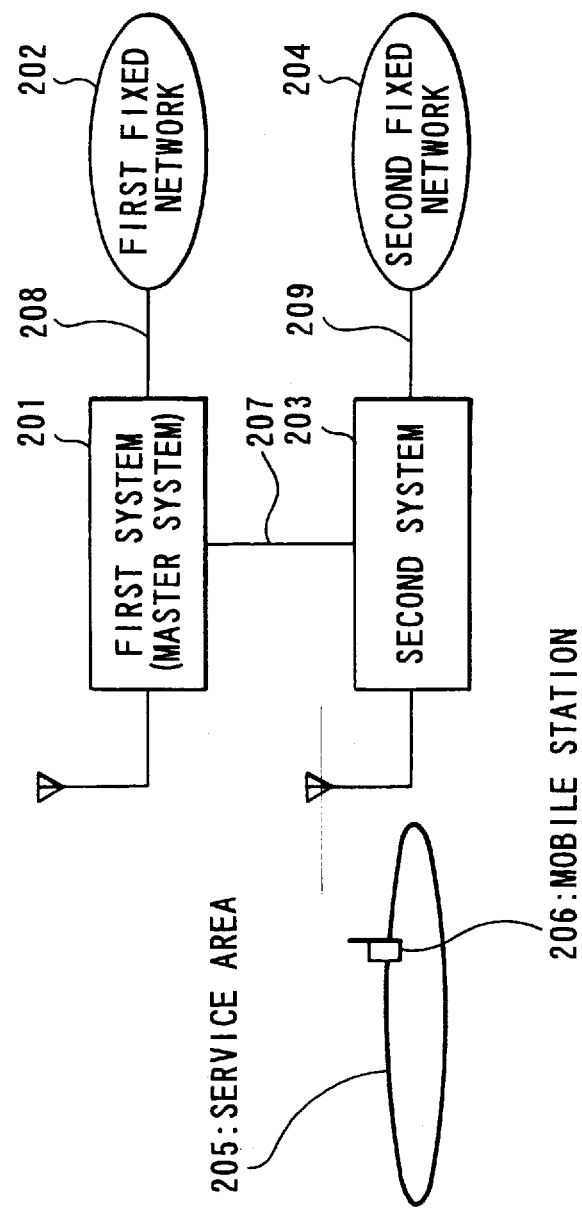
FIG. 2 shows an example configuration of the mobile communication system according to the first embodiment.
Figure 3:
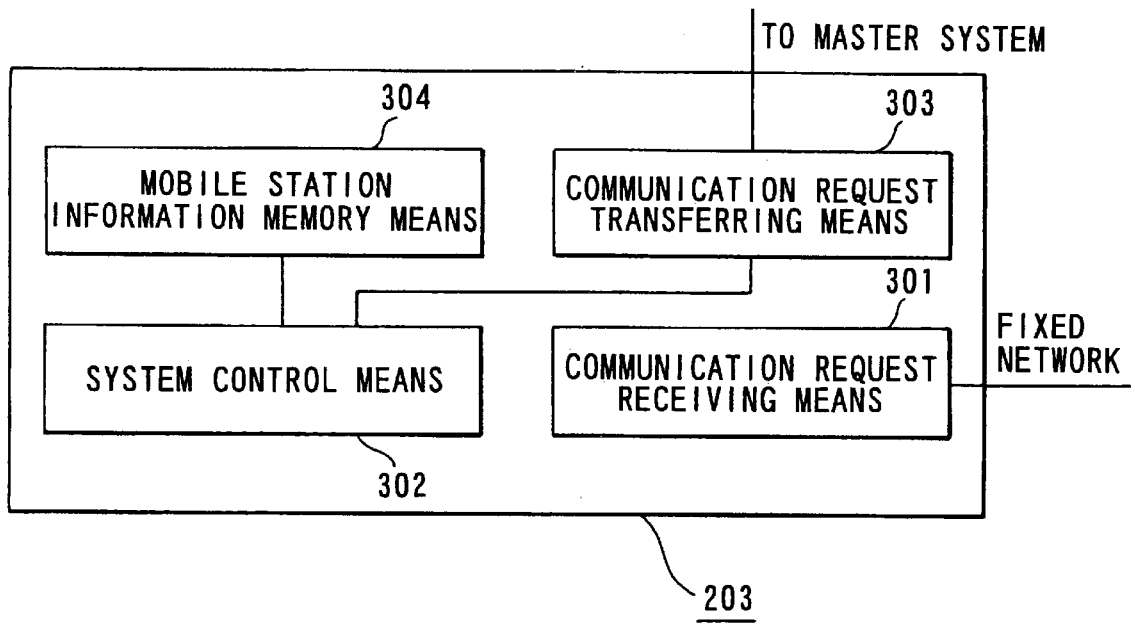
FIG. 3 shows an example configuration of a system except the master system in the mobile communication system.
Figure 4:
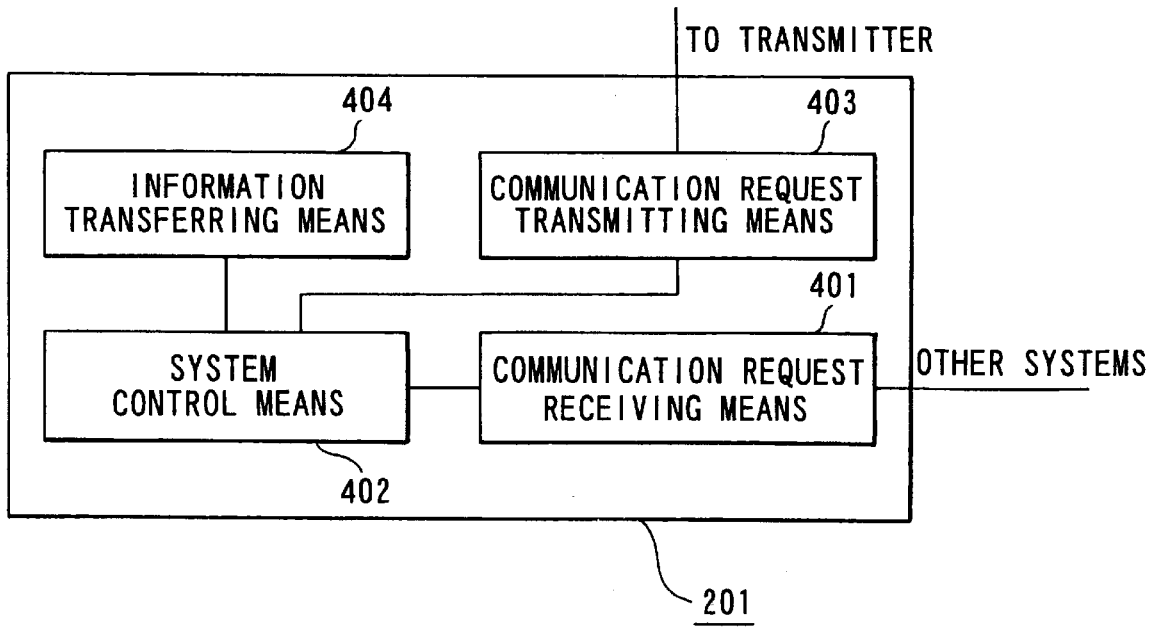
FIG. 4 shows an example configuration of the master system in the mobile communication system.
Figure 5:
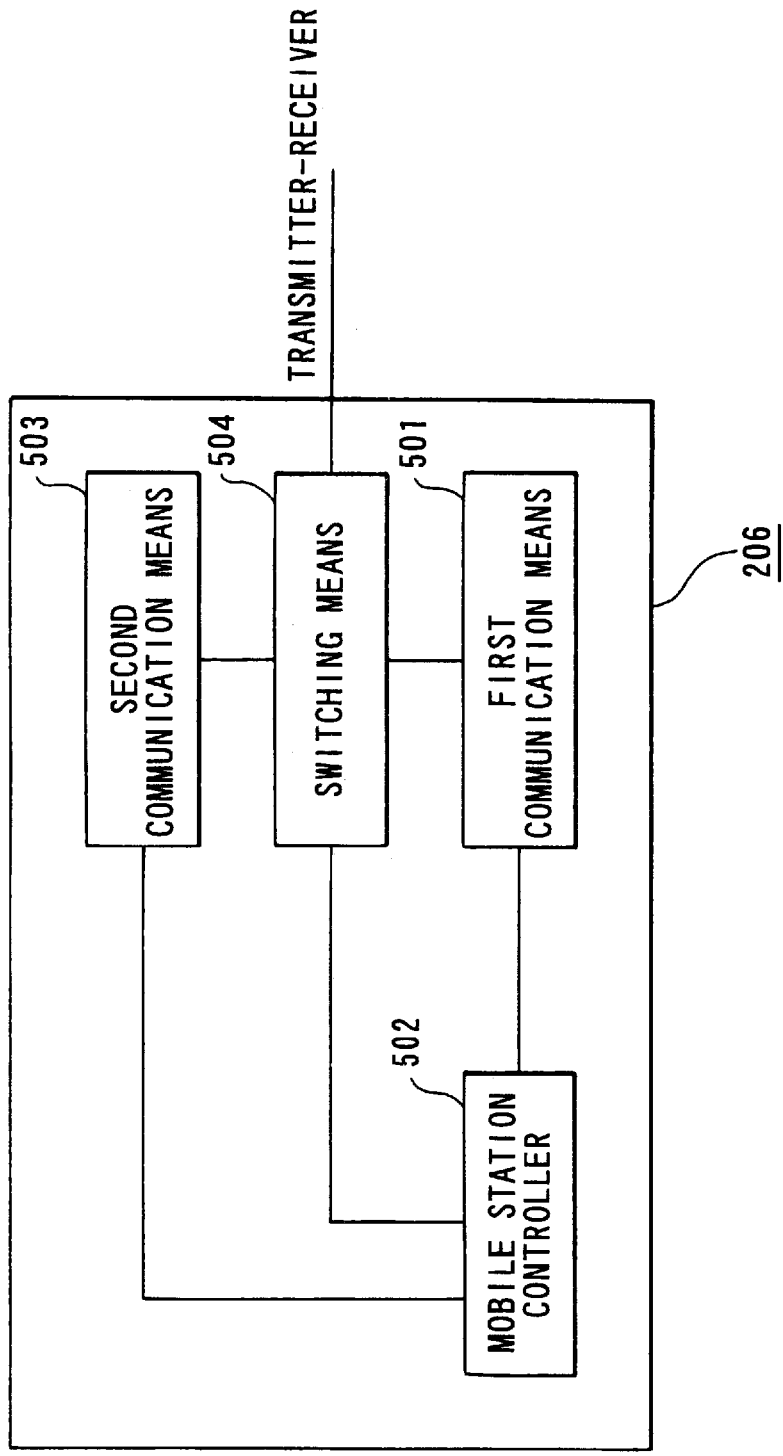
FIG. 5 shows an example configuration of the mobile station utilized in the mobile communication system.

FIG. 1 shows a sequence flow of an execution process of communication according to the first embodiment of the present invention. FIG. 2 shows an example configuration of the mobile communication system according to the first embodiment. FIGS. 3 to 5 show configurations of components utilized for the mobile communication system.

First, referring to FIG. 2, an example configuration of the mobile communication system, for executing the communication according to the first embodiment, will be described. In FIG. 2, the symbol 201 designates a first system which is the prespecified master system. The symbol 202 designates a first fixed network connected with the first system 201. The symbol 208 designates a control line for exchanging, between the first system 201 and the first fixed network 202, control signals such as the communication request, etc. The symbol 203 designates a second system which is not the master system. The symbol 204 designates a second fixed network connected with the second system 203. The symbol 209 designates another control line for exchanging, between the second system 203 and the second fixed network 204, control signals such as the communication request, etc. The symbol 207 designates a control line for transferring a communication request consigned to the system 201 when the communication request is generated by the second system 203. The symbol 205 designates a service area covered by both the first system 201 and the second system 203. The symbol 206 designates a mobile station equipped with communication means for both the first system 201 and the second system 203, the mobile station 206 moves in the service area 205.

Then, referring to FIG. 3, an example configuration of the second system 203, the non-master system, will be described. In FIG. 3, the symbol 301 designates a communication request receiving means for receiving the communication request, generated by the second fixed network 204 and consigned to the mobile station. The symbol 304 designates a mobile station information memory means for storing the information representing whether or not the mobile station providing the communication means for the first system 201. The symbol 303 designates a communication request transferring means for transferring the communication request to the first system 201. The symbol 302 designates a system control means for judging by means of the contents of the memory means 304, when the communication request receiving means 301 receives the communication request, whether or not the mobile station, the destination of the communication request, is equipped with the communication means for the first system 201. The system control means 302 transfers the communication request to the first system 201 by means of the communication request transferring means 303, if the mobile station is equipped with the communication means.

Then, referring to FIG. 4, an example configuration of the first system 201, the master system, will be described. In FIG. 4, the symbol 401 designates a communication request receiving means for receiving the communication request transferred from the second system 203 to the mobile station. The symbol 404 designates an information conversion means for enabling identification of the second system 203 on the basis of the communication request from the second system 203, and for assigning, an information identifying the second system 203, for the communication request issued by the second system 203. The symbol 403 designates a communication request transmitting means for transmitting, to the mobile station, the communication request via a transmitter in accordance with a prespecified communication sequence corresponding to the first system 201. The symbol 402 designates a system control means for converting the communication request when the communication request receiving means 401 receives the communication request by means of the information conversion means 404, and for transmitting the converted results to the mobile station by means of the communication request transmitting means 403.

Then, referring to FIG. 5, an example configuration of the mobile station 206 shown in FIG. 2 will be described in FIG. 5, the symbol 501 designates a first communication means for communicating with the first system 201, the symbol 503 designates a second communication means for communicating with the second system 203, and the symbol 504 designates a switching means for changing over the first communication means 501 and the second communication means 503. The symbol 502 designates a mobile station controller. The mobile station controller 502 is able to convert informations to and from the first communication means 501 and the second communication means 503 via the control line, and to select either the first communication means 501 or the second communication means 503 by means of the switching means 504.

Then, referring to FIG. 1, the method for serving notice of a communication request according to this embodiment will be described. In FIG. 1, components corresponding to those of FIG. 2 will be attached with the same symbols, and therefore, the explanation of them will be omitted.

In FIG. 1, the second system 203, the non-master system, confirms that the mobile station 206 is communicable with the first system 201, the master system, when a communication request 101 for the mobile station 206 is generated.

Then, the second system 203 transmits a communication request 102 to the first system 201. The circumstance, wherein the communication request 102 is generated, can be appeared when a call is transferred from the second fixed network 204 to the second system 203 via the control line 209, for example.

According to the communication request from the second system 203, the first system 201 transmits, to the mobile station 206, a communication request 103 with an information for identifying the fact that the second system 203 is the origin of the communication request.

Meanwhile, in the mobile station 206, when the communication does not takes place, the mobile station controller 502 shown in FIG. 5 sets the first communication means 501 into the usable condition by means of the switching means 504, and watching out the communication request from the first system 201. Then, if the mobile station controller 502 identifies, on the basis of the communication request 103 received via the first communication means 501, that the origin of the communication request received from the first system 201 is the second system 203, then the mobile station controller 502 executes connection with the second system 203 according to a prespecified process, and executes communication with the second system 203.

This embodiment is also applicable in the case where the mobile voice communication system is the master system and the mobile data communication system is the non-master system. The details are the following.

The mobile station is equipped with two communication means, one for the mobile voice communication system and another for the mobile data communication system, and watches out for the communication request in the mobile voice communication system when the communication does not take place. When a communication request is occurred in the mobile data communication system, the communication request is transferred to the mobile voice communication system, so that the mobile voice communication system transmits the communication request to the mobile station. The mobile station being supplied the communication request executes communication with the mobile data communication system by means of the communication means for the mobile data communication system.

II. Second Embodiment

A. Configuration of the embodiment

Figure 6:
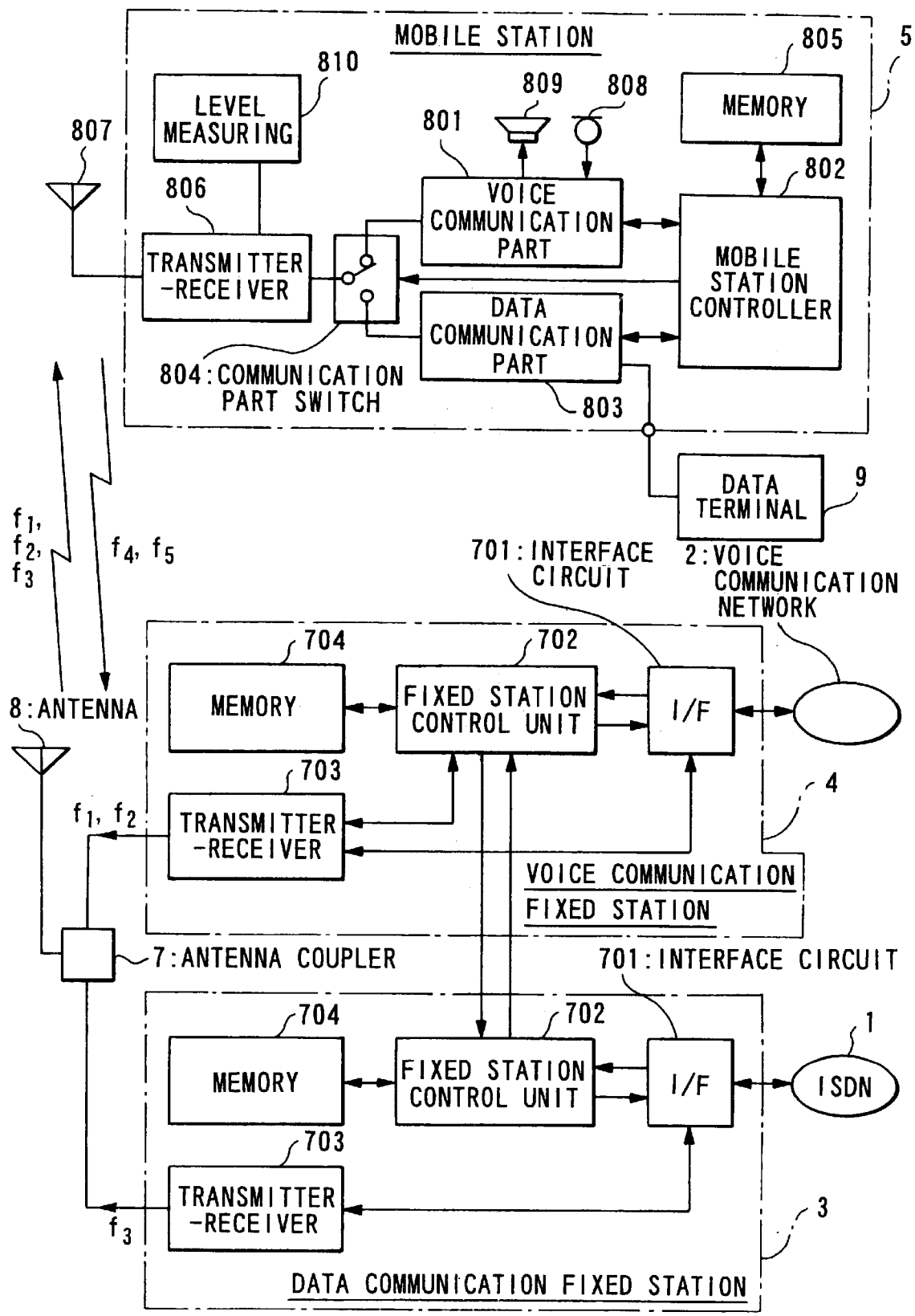
FIG. 6 shows a block diagram of the mobile communication system according to the second and third embodiments of the present invention.

Then, referring to FIG. 6, another embodiment of the present invention will be described.

In the drawing, the symbol 4 designates a voice communication fixed station, and the symbol 3 designates a data communication fixed station. The stations are provided for the identical service areas. In this embodiment, the voice communication fixed station 4 corresponds to the master system, and the data communication fixed station 3 corresponds to the slave system. The fixed stations 3 and 4 share an antenna 8 by means of an antenna coupler 7, and are in communication with a mobile station 5 visiting in the service area. More specifically, the voice communication fixed station 4 executes exchange between the voice communication network 2 and the mobile station 5, and the data communication fixed station 3 execute exchange between an ISDN (i.e., integrated service digital network) 1 and the mobile station 5. The symbol 9 designates a data terminal for transferring data, which is embodied by a personal computer, facsimile, etc.

In the mobile station 5, the symbol 802 designates a mobile station controller for controlling, according to sequences which will be described later, various parts in the mobile station 5. The symbol 805 designates a memory for storing various data utilized for the sequences. The symbol 801 designates a voice communication part for generating, according to a voice signal from a microphone 808, an uplink TDMA baseband signal. More specifically, the voice communication part 801 generates a digital signal by sampling the voice signal, and transmits, in the burst situation, the digital signal corresponding to a prespecified time slot.

The symbol 803 designates a data communication part for constructing packets on the basis of the digital signal supplied from the data terminal 9, and for generating the packets as the uplink packet baseband signal. The symbol 804 designates a communication part switch for supplying, to the transmitter-receiver 806, either the uplink TDMA baseband signal or the uplink packet baseband signal in accordance with the control of the mobile station controller 802. Then, the transmitter-receiver 806 modulates the supplied baseband signal and transmits the modulated results via the antenna 807. More specifically, if the uplink TDMA baseband signal is supplied via the switcher, the transmitter-receiver 806 modulates the signal and generates the modulated results as an uplink TDMA RF signal having the carrier frequency f4. Meanwhile, if the uplink packet baseband signal is supplied via the communication part switch 804, the transmitter-receiver 806 modulates the signal and generates the modulated results as an uplink packet RF signal having the carrier frequency f5.

Next, inside the voice communication fixed station 4, the symbol 703 designates a transmitter-receiver. If the uplink TDMA RF signal is supplied via the antenna 8 and the antenna coupler 7, sequentially, the transmitter-receiver 703 demodulates the signal and generates the demodulated signal. The demodulated signal is transmitted, via the interface circuit 701, to the voice communication network 2. The symbol 702 designates a fixed station control unit for controlling, according to sequences which will be described later, various parts in the voice communication fixed station 4, and for transferring various signals from and to the data communication fixed station 3. The symbol 704 designates a memory for storing various data utilized for the sequence.

Furthermore, the transmitter-receiver 703 receives via the voice communication network 2, by means of the interface circuit 701, voice signals for a plurality of visiting mobile stations. The transmitter-receiver 703 modulates, in the TDMA manner, the voice signals and transmits the modulated results as a downlink TDMA RF signal having the carrier frequency f2. When the downlink TDMA RF signal is received by the transmitter-receiver 806 via the antenna 807, the received signal is demodulated and generated as the TDMA baseband signal. The downlink TDMA baseband signal is supplied, via the communication part switch 804, to the voice communication part 801. In the voice communication part 801, time slots corresponding to the mobile station 5 are picked up among those in the downlink TDMA baseband signal. Then, the picked up portions are converted into an analog signal and sounded by the speaker 809.

Furthermore, the transmitter-receiver 703 generates, continuously, a level measuring channel having the carrier frequency f1. The level measuring channel has a constant RF level in all the time slots. Then, in the level measuring circuit 810 of the mobile station 5, electrical field power levels, of the level measuring channels generated by a plurality of voice communication fixed stations, are measured, and the visiting zone is determined according to the results. More specifically, the mobile station 5 visits into the voice communication fixed station having the highest electrical field power level.

Next, in the data communication fixed station 3, the symbol 603 designates a transmitter-receiver. When the uplink packet RF signal is supplied via the antenna 8 and the antenna coupler 7, sequentially, the transmitter-receiver 603 demodulates the supplied signal and generates the demodulated results. The demodulated signal is further transmitted to the ISDN 1 via the interface circuit 601. The symbol 602 designates a fixed station control unit for controlling, according to sequences which will be described later, various parts in the data communication fixed station 3, and for transferring various signals from and to the fixed station control unit 702 in the voice communication fixed station 4. The symbol 604 designates a memory for storing various data utilized for the sequence.

Furthermore, the transmitter-receiver 603 receives via the ISDN 1, by means of the interface circuit 601, packets for a plurality of visiting mobile stations. The transmitter-receiver 603 rearranges the packet supplied thereto, modulates the packets by the carrier frequency f3, and generates the modulated results as the downlink packet RF signal. When the downlink packet RF signal is received by the transmitter-receiver 806 via the antenna 807, the received signal is demodulated and generated as a downlink packet baseband signal. The downlink packet baseband signal is further supplied to the data communication part 803 via the communication part switch 804. In the data communication part 803, the time slots corresponding to the mobile station 5 are picked up among those in the downlink packet baseband signal. Then, the picked up portions are decomposed and supplied to the data terminal 9.

B. Operation of the embodiment

B-1. Operation for voice & packet mobile station

Then, operation of this embodiment will be described.

When the mobile station 5 visits the service area of the voice communication fixed station 4, location registration request is issued to the voice communication fixed station 4 from the mobile station 5. Then, the voice communication fixed station 4 executes location registration if possible. In this case, the voice communication fixed station 4 is informed of the subscriber number of the mobile station 5.

Incidentally, the mobile stations are classified into groups, a group corresponding only to the packet communication, another group corresponding to both the voice and packet communication such as the mobile station 5, and other group corresponding only to the voice communication. The mobile stations, which may request location registration for the voice communication fixed station 4, should belong to the latter two groups (corresponding to the voice communication). If the numbering systems of the mobile stations are differed from group to group, the type of the mobile station will be clarified just when the location registration takes place.

When the location registration of the mobile station concerning the packet communication is finished, the fixed station control unit 702 informs the fixed station control unit 602 of the subscriber number. Then, the subscriber number is stored, by means of the fixed station control unit 602, into the list of the mobile stations stored in the memory 604.

Next, referring to FIG. 7, the succeeding operation will be described.

The data communication fixed station 3 informs the voice communication fixed station 4 of channel information (i.e., channel numbers usable for packet communication and traffic quantities in the channels) every prespecified intervals T, whether or not the mobile station 5 is visiting. The channel information is stored temporarily in the memory 704 and broadcasted to the visiting mobile stations via the broadcast channel.

If the mobile station 5 is not in call connection, the communication part switch 804 is changed over into the voice communication part 801 side. Then, when the broadcast channel is received by the voice communication part 801, the contents of the channel is transferred to the mobile station controller 802. The mobile station controller 802 stores the channel information into the memory 805 if the channel information is included in the broadcast channel. Consequently, if the mobile station 5 has visited the service area of the voice communication fixed station 4, the channel information is received every prespecified interval T, and the contents of memory 805 is renovated on all such occasions.

Then, operation will be described in the case where a call is originated in the ISDN 1.

Figure 7:
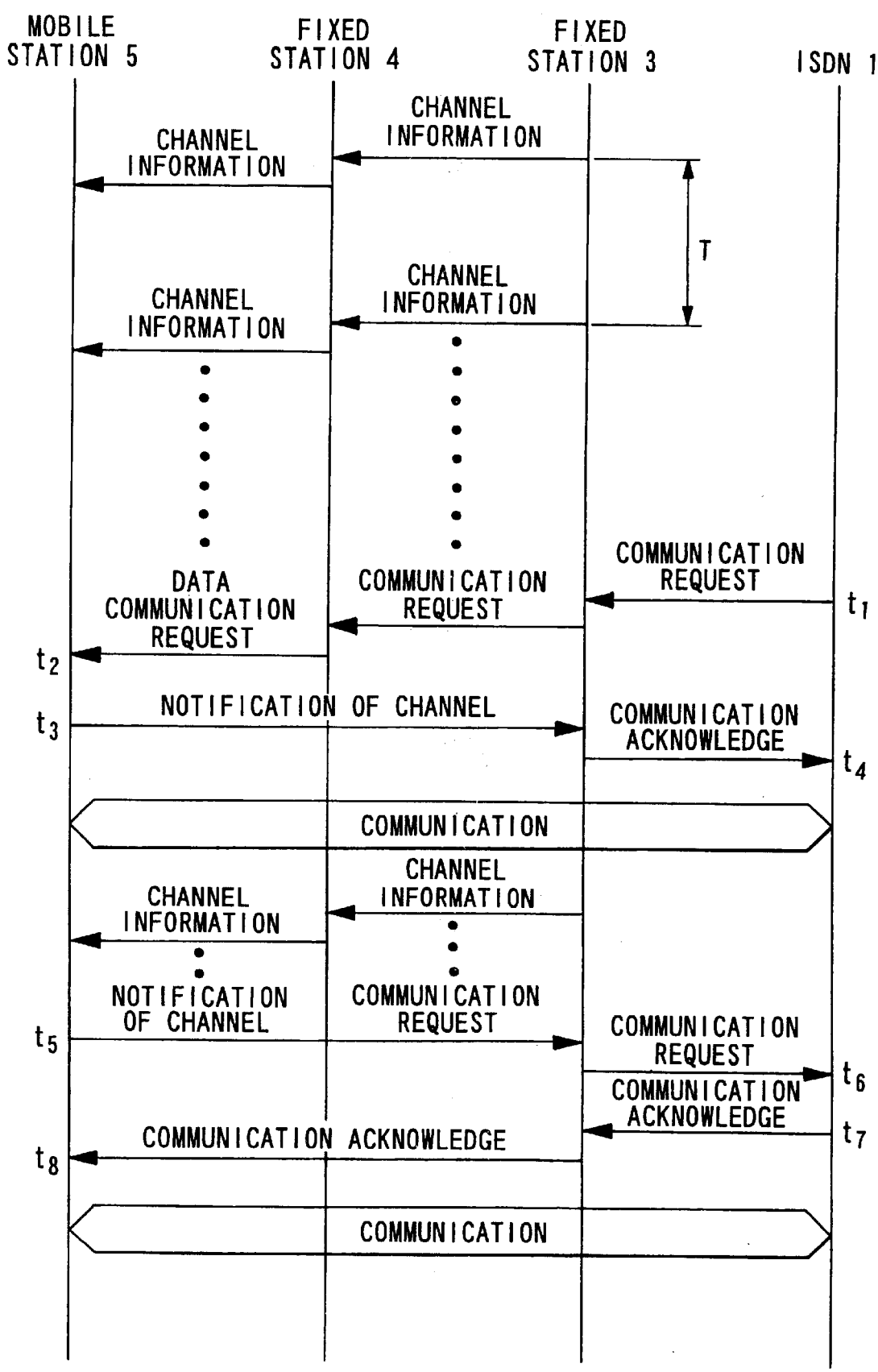
FIG. 7 shows a sequence diagram of the mobile communication system according to the second embodiment.

At time t1 in FIG. 7, a communication request for the mobile station 5 is transmitted from the ISDN 1 to the data communication fixed station 3. When the communication request is received, a judgment is made, in the data communication fixed station 3, whether or not the mobile station concerning the communication request is enumerated in the list of the mobile stations stored in the memory 604. If the mobile station is not enumerated, the fixed station control unit 602 sends the answer "communication failure" to the ISDN 1.

Meanwhile, if the mobile station is enumerated in the list of the mobile stations, the type of the mobile station (i.e., packet dedicated mobile station or voice & packet mobile station) is then judged according to the subscriber number. Then, if the mobile station is the voice & packet mobile station, the communication request is transferred to the fixed station control unit 702 in the voice communication fixed station 4. Incidentally, the operation in the case where the mobile station is a packet dedicated mobile station will be described later.

In the example described above, since the mobile station 5 is enumerated in the list of the mobile stations, and is the voice & packet mobile station, the communication request is transferred to the fixed station control unit 702. Then, in the fixed station control unit 702, judgment is made whether or not the communication between the mobile station 5 and the voice communication network 2 takes place. If the communication takes place, the answer "mobile station 5 is busy" is transferred to the ISDN 1 via the fixed station control unit 702 and the fixed station control unit 602, sequentially. Meanwhile, if the mobile station 5 is not carrying out communication with the voice communication network 2 (i.e., in the case where the mobile station 5 is receiving broadcast channel of the voice communication fixed station 4), a "data communication request" is transmitted to the mobile station 5 via the broadcast channel. In FIG. 7, the time when the data communication request is executed is expressed by "t2".

Since the data communication request differs from the communication request in the voice communication network 2, the mobile station 5 can distinguish the origin of the communication request among the ISDN 1 and the voice communication network 2. The data communication request is transmitted, via the transmitter-receiver 806, the communication part switch 804, and the voice communication part 801, sequentially, to the mobile station controller 802. Then, the channel information stored in the memory 805 is searched by the mobile station controller 802, and the channel having the least traffic quantity is selected.

Then, according to the control of the mobile station controller 802, the carrier frequency of the transmitter-receiver 806 is set into frequency f5 corresponding to the selected channel. Then, the communication part switch 804 is changed over into the data communication part 803 side. Then, at time t3, an information describing that "the communication is to carried out via the channel (carrier frequency f5)" is generated by the data communication part 803. The information is further transmitted to the fixed station control unit 602 via the antenna 8, the antenna coupler 7, and the transmitter-receiver 603, sequentially. The fixed station control unit 602 being supplied the information authenticates the communication for the ISDN 1. In FIG. 7, the time when the communication is authenticated is expressed by "t4".

Hereinafter, the packet communication is executed, via the data communication fixed station 3, between the ISDN 1 and the mobile station 5. When the communication is finished, the communication part switch 804 is changed into the voice communication part 801 side. Accordingly, the channel information is received every prespecified interval T, and the contents of memory 805 is renovated on all such occasions.

Then, operation will be described in the case where a call is originated in the mobile station 5.

If the operator executes a prespecified operation for the mobile station 5, the channel information stored in the memory 805 is searched by the mobile station controller 802, and the channel having the least traffic quantity is selected.

Then, according to the control by the mobile station controller 802, the carrier frequency of the transmitter-receiver 806 is set into frequencies f5 corresponding to the selected channel. Then, the communication part switch 804 is changed over into the data communication part 803 side. Then, a communication request, the request accompanied with an information describing that the communication is to carried out via the channel (carrier frequency f5) and with the subscriber number of the companion (i.e., the data terminal connected to the ISDN 1), is generated by the data communication part 803. In FIG. 7, the time when the communication request is issued is expressed by "t5". The communication request is transmitted to the fixed station control unit 602 via the antenna 8, the antenna coupler 7, and the transmitter-receiver 603, sequentially. Then, the fixed station control unit 602 being supplied the communication request issues the communication request for the ISDN 1 at time t6.

In the ISDN 1, the terminal of the companion is called. Then, at the time when the termination of call is confirmed (the time t7), the communication is authenticated for the data communication fixed station 3. Then, the authentication of communication is transferred immediately to the mobile station 5. In FIG. 7, the time when the communication is authenticated for the mobile station 5 is expressed by "t8". Hereinafter, the packet communication is executed between the ISDN 1 and the mobile station 5 via the data communication fixed station 3. When the communication is finished, the communication part switch 804 is changed into the voice communication part 801 side. Accordingly, the channel information is received every prespecified interval T, and the contents of memory 805 is renovated on all such occasions.

B-2. Operation concerning the mobile station dedicated for packet communication

As described above, some mobile stations are dedicated only for packet communication. Next, operations of such a mobile station (hereinafter, referred to as "packet dedicated mobile station") will be described. The configuration of the packet dedicated mobile station is not shown in the drawings, however, the configuration is similar to that of the mobile station 5 with the exception that the mobile station does not include the components for voice communication (i.e., the voice communication part 801, the communication part switch 804, and the microphone 808), and that the data communication part 803 and the transmitter-receiver 806 are connected directly.

The memory 805 for the packet dedicated mobile station previously stores a plurality of candidates for traffic channel of the data communication fixed station 3. When the power of the packet dedicated mobile station is turned on, the candidates for the traffic channel are scanned, sequentially, and a traffic channel having the highest reception field level is selected. Then, the packet dedicated mobile station is switched into the standby state for the traffic channel. More specifically, the packet dedicated mobile station sends a location registration request to the data communication fixed station 3, and the data communication fixed station 3 acknowledges the registration, if possible. Incidentally, the traffic channel can be selected by utilizing the perch channel.

Next, operation will be described in the case where a call is originated in the packet dedicated mobile station and thereby communication between the mobile station and the ISDN 1 takes place.

In this situation, the packet dedicated mobile station issues a communication request for the data communication fixed station 3 via the selected traffic channel described above. The succeeding operation is as similar to the case for mobile station 5 (see times t5 to t8 in FIG. 7). More specifically, in the case of mobile station 5, since the channel for packet communication had not been selected, the data communication fixed station 3 should be informed of the channel; however, in the case of the packet dedicated mobile station, since the traffic channel is selected previously, such an information is not required.

Next, operation will be described in the case where a call is originated in the ISDN 1 and thereby communication between the packet dedicated mobile station and the ISDN 1 takes place.

In this case, the communication request for the packet dedicated mobile station is transmitted from the ISDN 1 to the data communication fixed station 3. As described above, in the data communication fixed station 3, judgment is made whether or not the mobile station concerning the communication request is enumerated in the list of the mobile stations. Then, if enumerated, the type of the mobile station (i.e., the packet dedicated mobile station or the voice & packet mobile station) is judged on the basis of the subscriber number thereof.

In this case, the mobile station is enumerated in the list of the mobile stations, and is a packet dedicated one. Consequently, the data communication fixed station 3 issues the communication request to the packet dedicated mobile station via the selected traffic channel, and the packet dedicated mobile station answers for the request. Hereafter, data is transmitted from the ISDN 1 to the packet dedicated mobile station via the data communication fixed station 3.

As described above, according to the second embodiment, if the data communication request is transmitted to the mobile station 5, the channel notification is executed immediately (at time t3) on the basis of channel informations previously stored in the memory 805. Similarly, in the case where the mobile station 5 issues the communication request (at time t5), the channel is assigned when the communication request is issued. Accordingly, since there is no need for the mobile station 5 to scan the channel for packet communication so as to measure the reception field level, the communication can be started immediately.

Furthermore, according to this embodiment, if the communication request is issued by the ISDN 1, the mobile station 5 (i.e., voice & packet mobile station) is called via the voice communication fixed station 4, and the packet dedicated mobile station is called via the data communication fixed station 3. Therefore, in order to be called by both the data communication fixed station 3 and the voice communication fixed station 4, the mobile station 5 only has to receive the broadcast channel for the voice communication fixed station 4.

III. Third Embodiment

A. Configuration of the embodiment

Next, the third embodiment of the present invention will be described. The configuration of the third embodiment is as similar to that of the second embodiment (see FIG. 6). However, the operation thereof differs from that of the second embodiment, the details of which are the following.

B. Operation of the embodiment

B-1. Generation of peripheral zone informations and channel informations

First, the voice communication fixed station 4 informs, periodically, the data communication fixed station 3 of the value of the carrier frequency f1. Such a manner is suited for the system in which the channels assigned for the fixed stations are changed in accordance with traffic quantities in the zones, the zone concerning the voice communication fixed station 4 and other peripheral zones. The data communication fixed station 3 is in communication with data communication fixed stations in other zones (not shown), via a fixed station system for mobile communication. The fixed station 3 informs the data communication fixed stations in other zones of the carrier frequency f1, and conversely, is informed of carrier frequencies of level measuring channels in other zones.

As such, when the data communication fixed station 3 obtains the carrier frequencies of level measuring channels in the home zone and other zones, the fixed station 3 combines them into peripheral zone information in the memory 604. FIG. 9(c) shows the contents of the peripheral zone information. In the drawing, the number of enumerated zones in the peripheral zone information is stored at the top of the peripheral zone information. Furthermore, identification of zones and the carrier frequencies of the level measuring channels in the zones are stored sequentially.

Meanwhile, the data communication fixed station 3 informs, periodically, the voice communication fixed station 4 of a channel information concerning packet communication, and the information is stored in the memory 704. The contents of the channel information is shown in FIG. 9(b). In the drawing, the number of the traffic channels enumerated in the channel information is stored at the top of the channel information. Furthermore, each carrier frequency and each traffic quantity of the traffic channels are stored corresponding to the channels.

The peripheral zone information is broadcasted, periodically, from the data communication fixed station 3 to the visiting mobile stations.

The data communication fixed station 3 broadcasts intermittently, the peripheral zone information stored in the memory 604, to the mobile station carrying out the packet communication. More specifically, if a packet for any of the mobile stations is transmitted from the ISDN 1 to the data communication fixed station 3, the peripheral zone information is added to the packet, and the packet including the peripheral zone information is transferred to the pertinent mobile station.

B-2. Authentication of visiting of the mobile station, etc.

The memory 805 in the mobile station 5 is provided with a ROM area in which a plurality of carrier frequencies, frequencies of the candidates for the level measuring channel, are stored. When the power of the mobile station 5 is turned on, the ROM area is read out first, and the candidates for the level measuring channel are scanned, sequentially. Then, the mobile station 5 visits the zone corresponding to the level measuring channel having the highest reception field level. It is assumed that the reception field level of the level measuring channel of the voice communication fixed station 4 (carrier frequency f1) is the highest one.

Then, the mobile station 5 selects a temporary traffic channel of the data communication fixed station 3 on the basis of the channel information multiplexed on the level measuring channel, and issues a location registration request for the data communication fixed station 3 via the temporary traffic channel. Incidentally, if the voice communication fixed station 4 and the data communication fixed station 3 are provided with a transferring means for transferring control signals, the location registration can be issued via the level measuring channel. The data communication fixed station 3 executes location registration, relevantly, if possible. In this case, the mobile station 5 informs the data communication fixed station 3 of the subscriber number of the mobile station 5, and the subscriber number is stored into the list of the mobile stations stored in the memory 604 by means of the fixed station control unit 602.

B-3. Packet communication

Next, referring to FIG. 8, operation in the case where a call is originated in the ISDN 1 will be described.

Figure 8:
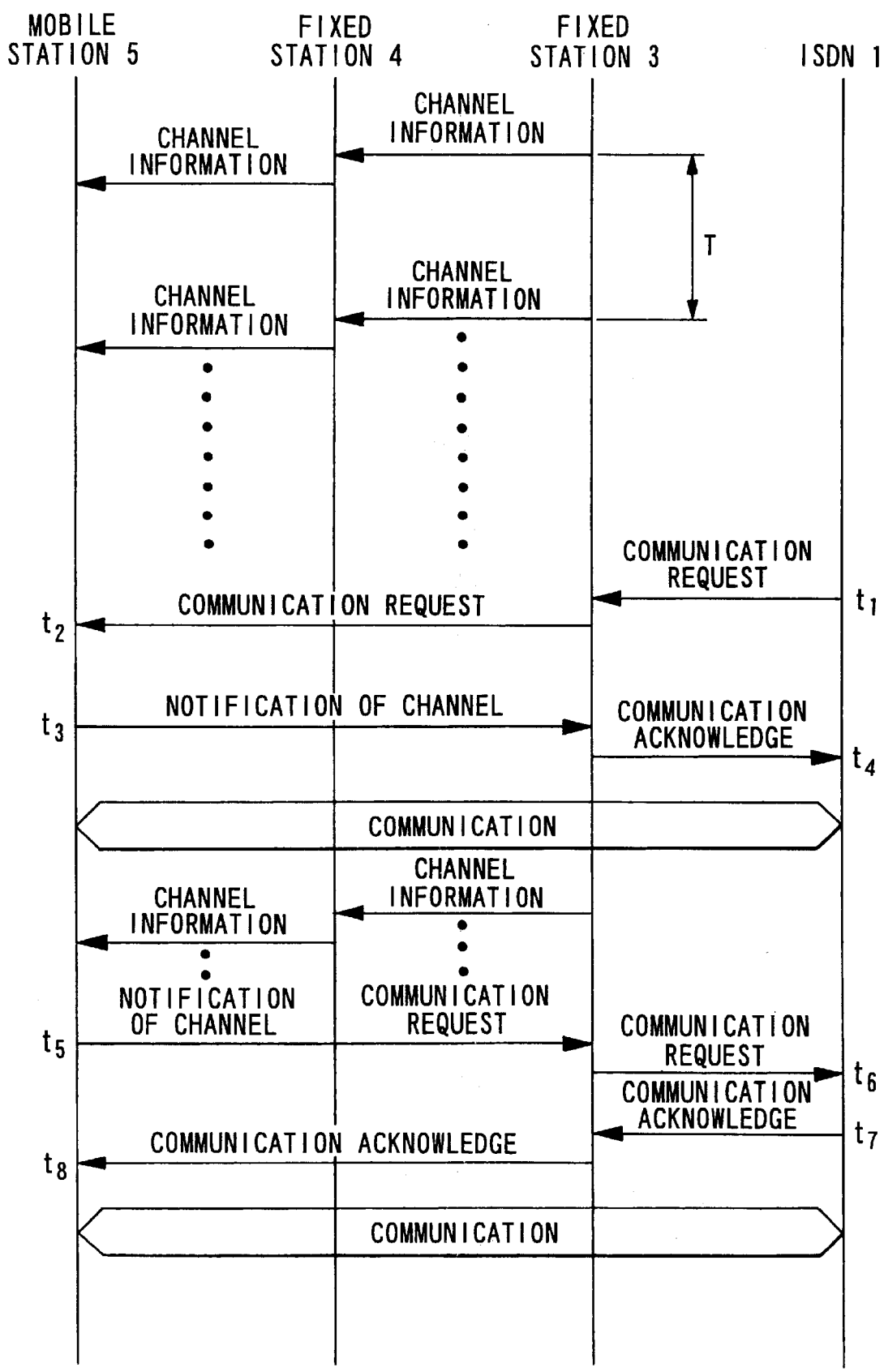
FIG. 8 shows a sequence diagram of the mobile communication system according to the third embodiment.

In FIG. 8, a communication request for the mobile station 5 is issued from the ISDN 1 to the data communication fixed station 3 at time t1. When the communication request is received, a judgment is made, in the data communication fixed station 3, whether or not the mobile station concerning the communication request is enumerated in the list of the mobile stations stored in the memory 604. If the mobile station is not enumerated in the list of the mobile stations, the fixed station control unit 602 sends the answer "communication failure" to the ISDN 1.

Meanwhile, since the mobile station 5 is enumerated in the list of the mobile stations in the example described above, the "data communication request" is transmitted to the mobile station 5 from the data communication fixed station 3. In FIG. 8, the time when the communication request is issued is expressed by "t2". The data communication request is transmitted to the mobile station controller 802 via the transmitter-receiver 806, the communication part switch 804, and the data communication part 803, sequentially. Then, the channel information stored in the memory 805 is searched by means of the mobile station controller 802, whereby a channel is selected.

Then, according to control of the mobile station controller 802, the carrier frequency of the transmitter-receiver 806 is set into the frequency f5 corresponding to the selected channel. Then, at time t3, an information describing that the communication is to be carried out via the channel (carrier frequency f5) is generated by the data communication part 803. This information is transmitted to the fixed station control unit 602 via the antenna 8, the antenna coupler 7, and the transmitter-receiver 603, sequentially. Then, the fixed station control unit 602 being supplied the communication request issues an authentication of communication for the ISDN 1. In FIG. 8, the time when the authentication of communication is issued is expressed by "t4".

Hereinafter, the packet communication is executed, via the data communication fixed station 3, between the ISDN 1 and the mobile station 5. In this case, as described above, the peripheral zone information is added to the packet, intermittently, by means of the data communication fixed station 3. When a new peripheral zone information is transferred to the mobile station 5, the contents thereof is stored in the memory 805.

Furthermore, the mobile station 5 measures, at the timings when the signal reception is not required (e.g., the timings time slots are not assigned in the TDMA system), reception field levels of level measuring channels of the voice communication fixed station 4 and of other adjacent zones. More specifically, the receiving frequency of the transmitter-receiver 806 is switched to the level measuring channels by means of the mobile station controller 802, and the reception field levels of the level measuring channels are measured by the level measuring circuit 810.

Then, the measured reception field level is stored in the memory 805. If any of the reception field levels in other zones is higher than that of the level measuring channel in the visiting zone (carrier frequency f1) by a prespecified value, the mobile station 5 specifies a temporary traffic channel to the other zone (hereinafter, referred to as "transfer destination zone"), via the level measuring channel of the transfer destination zone. Then, the mobile station 5 issues a location registration request to the data communication fixed station in the transfer destination zone. Then, the data communication fixed station for the transfer destination zone executes the location registration, if possible. Then, the previous location registration concerning the mobile station 5 in the data communication fixed station 3 is eliminated.

As such, the mobile station 5 changes the visiting zone thereof, if necessary, while communicating with the ISDN 1. When the communication is completed, the channel information is received every prespecified interval T, and the contents of memory 805 is renovated on all such occasions.

Next, the operation in the case where a call is originated in the mobile station 5 will be described.

If the operator executes a prespecified operation for the mobile station 5, the channel information stored in the memory 805 is searched by the mobile station controller 802, and a channel is selected.

Then, according to control of the mobile station controller 802, the carrier frequency of the transmitter-receiver 806 is set into the frequency f5 corresponding to the selected channel. Then, a communication request, the request accompanied with an information describing that the communication is to be carried out via the channel (carrier frequency f5) and with the subscriber number of the companion (i.e., the data terminal connected to the ISDN 1), is generated by the data communication part 803. In FIG. 8, the time when the communication request is issued is expressed by "t5". The communication request is transmitted to the fixed station control unit 602 via the antenna 8, the antenna coupler 7, and the transmitter-receiver 603, sequentially. Then, the fixed station control unit 602 being supplied the communication request issues the communication request for the ISDN 1 at time t6.

In the ISDN 1, the terminal of the companion is called. Then, the time when the termination of call is confirmed (the time t7), the communication is authenticated for the data communication fixed station 3. Then, the authentication of communication is transferred immediately to the mobile station 5. In FIG. 8, the time when the communication is authenticated for the mobile station 5 is expressed by "t8". Hereinafter, the packet communication is executed between the ISDN 1 and the mobile station 5 via the data communication fixed station 3. When the communication is finished, the communication part switch 804 is changed into the voice communication part 801 side. Accordingly, the channel information is received every prespecified interval T, and the contents of memory 805 is renovated on all such occasions.

Needless to say, in the case where the call is originated in the mobile station 5 side, the visiting zone of the mobile station 5 is changed, if necessary. The control operation in this case is as similar to another case where the call is originated in the ISDN 1.

As described above, according to this embodiment, the level measuring channels in the various zones are broadcasted, from the voice communication fixed station 4 and the ISDN 1, to the data communication fixed station 3, and thereby the peripheral zone informations are broadcasted, from the data communication fixed station 3, to the mobile station 5. Accordingly, a level measuring channel can be shared by a plurality of fixed stations, the number of the level measuring channels is reduced, influences can be suppressed, and thereby an excellent communication quality can be obtained.

C. Modified examples

It will be appreciated that modifications may be made in the third embodiment as shown in the following examples. (i) The data communication fixed station 3 may receive the channel information from data communication fixed stations in other zones; generate a "channel correspondence information" as shown in FIG. 9(*a*); and broadcast the information to the mobile stations. The "channel correspondence information" is composed such that the zone numbers the frequency of the level measuring channel, and the channel information (see FIG. 9(*b*)) are enumerated for every zone. The mobile station 5 stores the channel corresponding information into memory 805. Accordingly, if the visiting zone is to be changed when the packet communication takes place, the traffic channel concerning the data communication fixed station for the transfer destination zone can be designated, immediately, and thereby the zone transfer can be executed, more immediately. (ii) In the third embodiment, the fixed station control units 602 and 702 exchanges the channel informations and peripheral zone informations, with each other. This operation is based on the assumption that the level measuring channels and the traffic channels are subject to change by the traffic quantity, etc. in the zones. Meanwhile, there are other mobile communication systems in which the various channels are fixed. In the latter case, the memories 604 and 704 may store the channel informations and peripheral zone informations, previously, and broadcast the previously stored informations to the mobile station 5.

IV. Protocols Adopted in the Embodiments

Then, protocols adopted for the above embodiments will be described. Some of the protocols described below can be adopted for a plurality of embodiments, first to third embodiments. Therefore, the system configuration utilized for the protocol description is an abstraction, of the configuration of the first to third embodiments, as shown in FIG. 10. In FIG. 10, the symbol 11 designates a master system. The master system can be embodied by any of a plurality of communication systems (e.g., data communication, voice communication, pager, and PHS) which cover the identical service area. The symbol 12 designates a slave system, generalizing the systems except the master system 11. The symbol 13 designates a combiner-divider.

(1) Notification of communication request (i) Principle operation

Next, referring to FIG. 11, a principle protocol for notification of the communication request will be described.

First, a communication request for the mobile station 5 is issued from the external network to the slave system 12.

Then, in the slave system 12, a judgment is made whether or not the mobile station 5 is equipped with a communication function for the master system. If the judgment is "TRUE", the communication request is transferred along the solid lined arrow. More specifically, the communication request is transferred to the master system 11 and further transferred to the mobile station 5.

Meanwhile, if the mobile station 5 has no communication function for the master system, the slave system 12 notifies, directly, the mobile station 5 of the communication request along the broken lined arrow.

Figure 48:
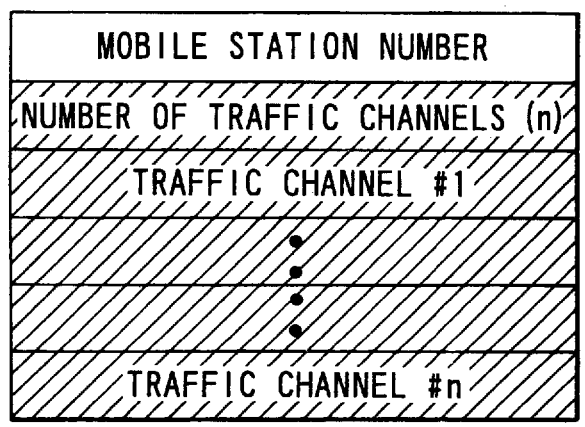
FIG. 48 shows an example of paging of the communication requests and the traffic channels which are to broadcasted to the mobile station.

In any case, it is more preferable that the mobile station is informed of selectable traffic channels accompanied with the communication request. FIG. 48 shows an example of a paging of the communication request. In the drawing, the communication request includes a mobile station number of the pertinent mobile station, a number of the selectable traffic channels, and these traffic channels. As such, if the communication request is accompanied with the traffic channel information, receiving of the traffic channel information, previously or subsequently to the receiving of the communication request, becomes unnecessary.

(ii) Zone structure

The zone structures of mobile communication systems are generally classified into omni-structure and sector-structure. At the same time, there may be a case in which the master system 11 and the slave system 12 have the same structure, and another case in which the structures differ. The latter case is further classified by the structure, the sector-structure or the omni-structure, of the master system 11. FIGS. 12(*a*) & (*b*) show the examples thereof.

(2) Notification of the traffic channel of the home zone

Next, description will be made for protocols in which the slave system 12 is informed, via the master system 11, of the traffic channel to be used. Since the protocols differ from zone structure to zone structure of the master system 11 and the slave system 12, the descriptions of those will be made separately.

(i) Master system and slave system have the same zone structure

If both the master system 11 and the slave system 12 are in the omni-structure, the master system 11 broadcasts, to the mobile station 5, all the traffic channels available in the slave system 12. Meanwhile, if both the master system 11 and the slave system 12 are in the sector-structure, the traffic channels assigned for each sector in the slave system are broadcasted from the corresponding sector in the master system. In either case, the mobile station 5 selects a channel to be used among the provided traffic channels.

(ii) Master system has sector-structure, and slave system has omni-structure

First, in the slave system 12, the available frequencies (i.e., traffic channels) are assumed to be f1 to f5. In the system shown in FIG. 14(*a*), all the frequencies f1 to f6 are broadcasted to the mobile stations from the sectors in the master system 11. More specifically, the identical informations are broadcasted from every sector.

Figure 14A:
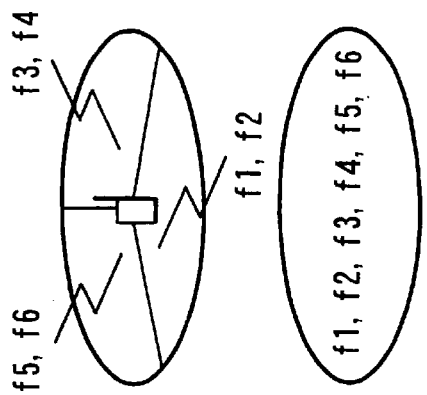
Figure 14B:
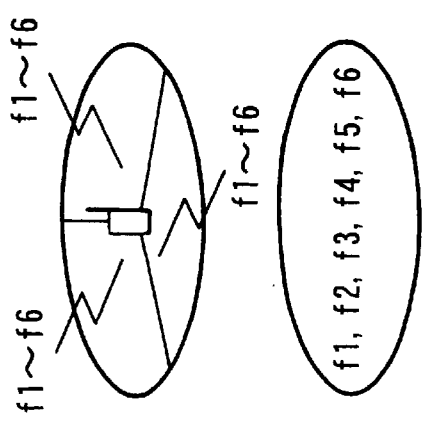

Meanwhile, in FIG. 14(*b*), the available frequencies f1 to f6 are further divided and assigned for the sectors in the master system 11, and only the frequencies assigned are broadcasted to the mobile stations in each sector.

The former case is advantageous in the degree of freedom of the traffic channel to be assigned to the mobile stations, however, disadvantageous in that much data quantity is required for broadcasting numerous channels, so that data quantity for actual communication may be suppressed. Meanwhile, since the number of channels broadcasted is small, the latter case is advantageous at effective utilization, of data quantity, in the entire system. However, if the number of the mobile stations are concentrated to a part of sectors, the number of the traffic channels in the sector may become insufficient, even if the number of traffic channel in the entire system is sufficient.

As such, both the systems have merits and demerits, and it is preferable to select, automatically, either system according to circumstances. For example, if the number of occupied channels in the zone of slave system 12 is larger than a prespecified value, the system shown in FIG. 14(*a*) may be selected, while if not, the system shown in FIG. 14(*b*) may be selected.

(iii) Master system has omni-structure, and slave system has sector-structure

The cell of the slave system 12 is divided into three sectors (i.e., first to third zones), and the frequencies f1 & f2, f3 & f4, and, f5 & f6 are assigned to the zones, respectively. According to the system shown in FIG. 15(*a*), all the frequencies f1 to f6 are broadcasted by the master system 11 to the mobile stations. Incidentally, the mobile station communicating with the master system could not identify its visiting zone. Therefore, the mobile station should measure, sequentially, the level of traffic channels broadcasted thereto, and should select a traffic channel having the reception power level higher than a prespecified value.

Figure 15A:
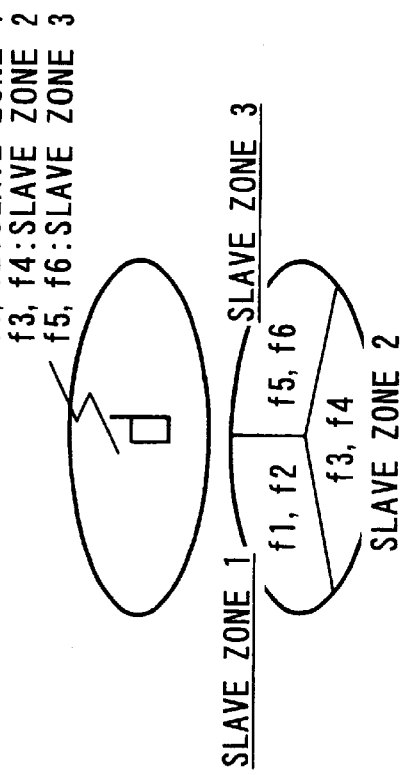
Figure 15B:
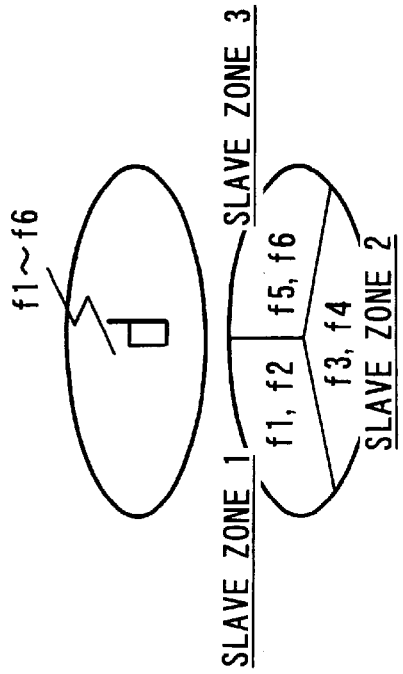

Meanwhile, according to the system in FIG. 15(*b*), when the available frequencies f1 to f6 are broadcasted, informations for identifying corresponding zones in the slave system are also broadcasted. The mobile station measures, previous to selecting the channel to be used, the reception power level of one each arbitrary channel (e.g., the frequencies f1, f3 and f5) in the zones. Then, the mobile station visits the zone corresponding to the channel having the highest reception power level. Since the mobile station selects a traffic channel among the channels in the visiting zone, the interval for channel selection can be shortened.

(iv) Details of notification of the traffic channels

Next, an example of operations for notifying of the traffic channels will be described.

(iv-1) First, referring to FIG. 44, operations will be described in the case where the call is terminated to the mobile station. In the drawing, the master system broadcasts intermittently, in the period designated by "T1", the traffic channel information to the mobile station, so that the contents of the information are stored in the mobile station. When a communication request is issued in the slave system, the communication request is transferred to the master system, and then broadcasted to the mobile station. In the mobile station, a channel for use is selected among those previously stored, and the slave system is informed of the selected channel. Accordingly, communication is executed, hereinafter, between the slave system and the mobile station via the provided channel.

(iv-2)

Next, referring to FIG. 45, operations will be described in the case where the call is originated in the mobile station. In the drawing, the master system broadcasts intermittently, in the period designated by "T1", the traffic channel information to the mobile station, so that the contents of the information are stored in the mobile station. When a communication request is issued in the mobile station, the mobile station selects a channel for use among those previously stored, and informs the slave system of the selected channel. Accordingly, communication is executed, hereinafter, between the slave system and the mobile station via the provided channel.

(3) Notification of the traffic channel of the adjacent zone

When the traffic channel is selected by the mobile station and the communication between the mobile station and the slave system is started, the mobile station is required to select, intermittently, the traffic channels in the peripheral zones for handover of the channel if necessary. There are two techniques considered for the channel selection; one is to broadcast, in the visiting zone, the traffic channels in the peripheral zones and a communication channel of the home zone, and to select the channel, directly; and another is to broadcast, in the visiting zone, the level measuring channels in the peripheral zones, and to select the traffic channel, by means of the level measuring channel, after the zone selection is completed. Then, description will be made for embodying the former technique. Since the protocols are differ from zone structure to zone structure of the master system 11 and the slave system 12, the contents of which will be described separately.

(i) Master system and slave system have the same zone structure

If both the master system 11 and the slave system 12 are in the omni-structure, the master system 11 broadcasts, to the mobile station 5, channel groups (each group consists of a plurality of frequencies) F2s to F7s utilized in the peripheral zones. Incidentally, if both the master system 11 and the slave system 12 are in the sector-structure, the similar operation is executed, so that the channel groups in the peripheral zones are broadcasted to the mobile station. Consequently, the mobile station compares the reception power level of the current channel (a channel in the channel group F1s) with those of one each arbitrary frequency in the channel groups F2s to F7s, and executes channel switching (zone switching) on the basis of comparison results.

(ii) Master system has sector-structure, and slave system has omni-structure

First, in order to simplify the description, the peripheral zones of the slave system 12 are assumed to be only first and second zones. The channel group F1s of the first zone consists of the frequencies f1 & f2, and the channel group F2s of the second zone consists of the frequencies f3 & f4.

In the system shown in FIG. 17(a), all the frequencies f1 to f4 are broadcasted from the sectors in the master system 11 to the mobile stations. More specifically, the same informations are broadcasted from every sector. Furthermore, according to the system shown in FIG. 17(b), in addition to the contents in FIG. 17(a), informations for distinguishing correspondence between the peripheral zones (the first or second zone) and the frequencies f1 to f4 are broadcasted.

Meanwhile, according to the system shown in FIG. 17(c), the frequencies f1 to f4 in the peripheral zones of the slave system 12 are divided and assigned for the sectors in the master system 11, and, in the sectors, only the frequencies assigned are broadcasted to the mobile stations. Furthermore, according to the system shown in FIG. 17(d), in addition to the contents in FIG. 17(c), informations for distinguishing correspondence between the peripheral zones (the first or second zone) and the frequencies f1 to f4 are broadcasted.

According to the systems shown in FIGS. 17(a) and (b), when channel switching, etc. is required, the degree of freedom of the traffic channel after switching can be improved. However, since much data quantity is required for broadcasting numerous channels, the data quantity for actual communication may be suppressed. Meanwhile, According to the systems shown in FIGS. 17(c) and (d), since the number of channels broadcasted is small, the data quantity in the entire system can be utilized effectively. However, if number of the mobile stations are concentrated to a part of sectors, the number of the traffic channels in the sector may become insufficient, even if the number of traffic channel in the entire system is sufficient.

Therefore, it is preferable to select either system according to circumstances, as similar to the case in FIGS. 14(a) and (b).

(iii) Master system has omni-structure, and slave system has sector-structure

Then, it is assumed that the master system is in the omni-structure, and the cells therein are arranged in a hexagonal arrangement. In this situation, as shown in FIG. 18(a), total seven cells (the mobile station 5 is visiting the center cell) should be considered. Meanwhile, in the slave system, the cell corresponding to the center cell of the master system is divided into first to third zones (the zones correspond to channel groups F1s to F3s, respectively), as shown in FIG. 18(b).

So long as the mobile station 5 is visiting the center cell of master system 11, it is apparent that the mobile station 5 is also visiting in any of the first to third zones. However, it is not easy for the master system 11 to identify the specific zone, in which the mobile station 5 is visiting, among these zones. Therefore, the peripheral zone (more specifically, zones which may be the peripheral zones) are the first to fifteenth zones (channel groups F1s to F15s).

Accordingly, the mobile station 5 is informed of the entire channel groups F1s to F15s. In this situation, there may be two techniques for informing of the channel groups F1s to F15s; a technique in which the mobile station 5 is merely informed of the channel groups F1s to F15s (see FIG. 19(a)), and another technique in which the mobile station 5 is informed of the channel groups F1s to F15s together with identification numbers of the peripheral zones.

Figure 20:
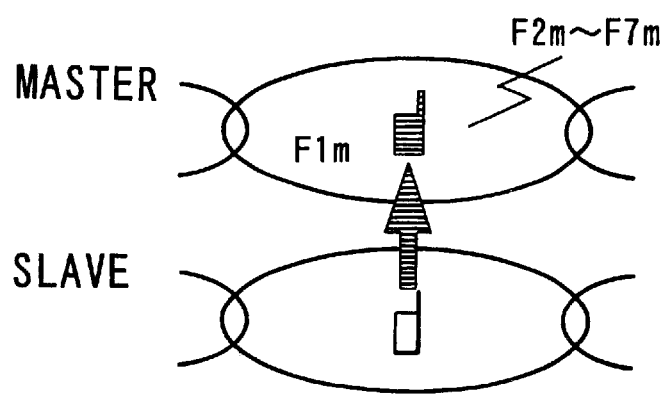
FIGS. 20, 21, 22A, 22B, 23A, 23B, 24, 25, 26A, 26B, 27, 28A, 28B, 29, 30, 31A, 31B, 32, 33A, 33B, 34, 35, 36 and 37 are the explanation drawings of a protocol for broadcasting, to the mobile stations, the level measuring channel in the master system.
Figure 21:
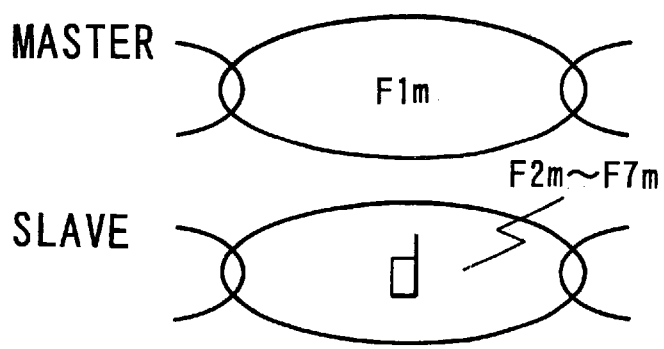

(4) Notification of the level measuring channel of the master system (i) Principle operation In the third embodiment, since the level measuring channel is provided only in the master system, the mobile stations carrying out the communication in the slave system should be informed of the level measuring channels in the peripheral zones of the master system. In this situation, the mobile station 5 can be informed of the level measuring channel by either the master system as shown in FIG. 20, or from the slave system as shown in FIG. 21.

In both cases, if the mobile station is carrying out the communication in the slave system, the mobile station measures reception field levels of the level measuring channels informed previously. The control sequences, of the notification of level measuring channels of the master system for the mobile stations, are shown in FIGS. 46 and 47. FIG. 46 shows the control sequence in which the notification of level measuring channels is executed by the mobile station, while FIG. 47 shows another sequence in which the notification is executed by the slave system. In the drawings, the master system or the slave system inform, sequentially, the mobile station of the level measuring channels, and contents of the informations are stored in the mobile station. Furthermore, on the basis of the stored information, the reception field levels are measured when the communication takes place.

Figure 22A:
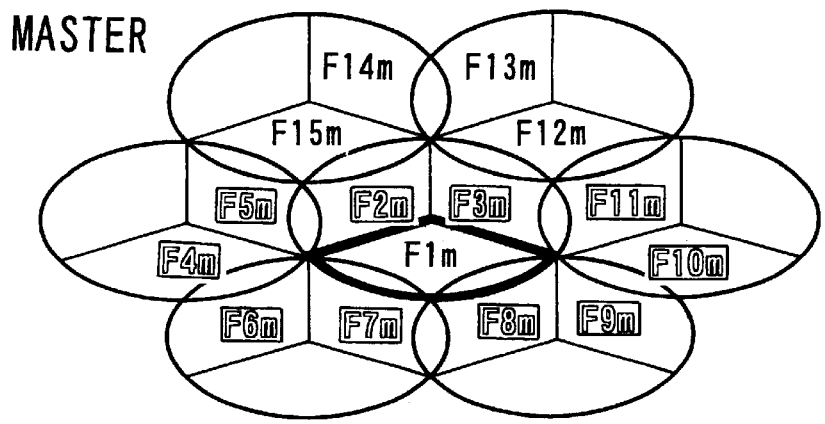
Figure 22B:
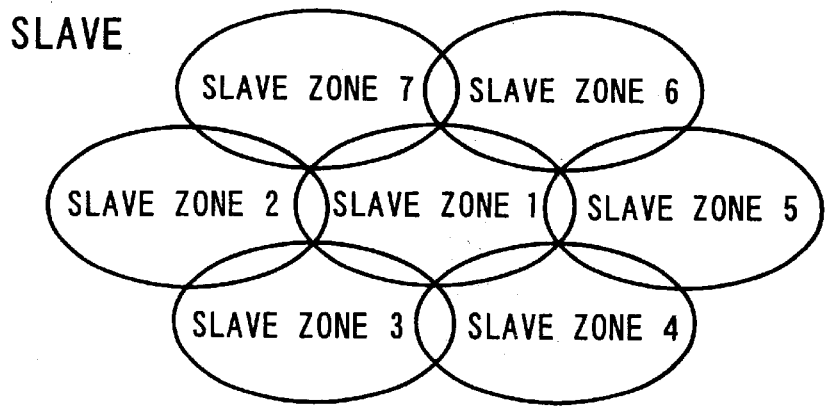

(ii) Master system has sector-structure, slave system has omni-structure, and, informations for identifying peripheral zones of master system is informed by master system As shown in FIGS. 22(a) and (b), if the master system has the sector-structure and the slave system has the omni-structure, the mobile station will visit either zone so as to receive notification of the level measuring channels, etc. of the peripheral zones. As described below, various embodiments can be considered as to which zones of the master system are supposed to be the peripheral zones.

(ii-1) Zones of master system adjoining the visiting zone of master system are supposed to be surrounding zones If the mobile station is visiting the zone having the level measuring channel F1m, the peripheral zones are supposed to be the zones having the level measuring channels F2m to F11m. More specifically, the mobile station is informed of the level measuring channels F2m to F11m. Then, the mobile station compares the reception field level of the level measuring channel F1m in the visiting zone and those of the level measuring channels F2m to Film in the peripheral zones, and executes zone switching according to the compared results.

Figure 24:
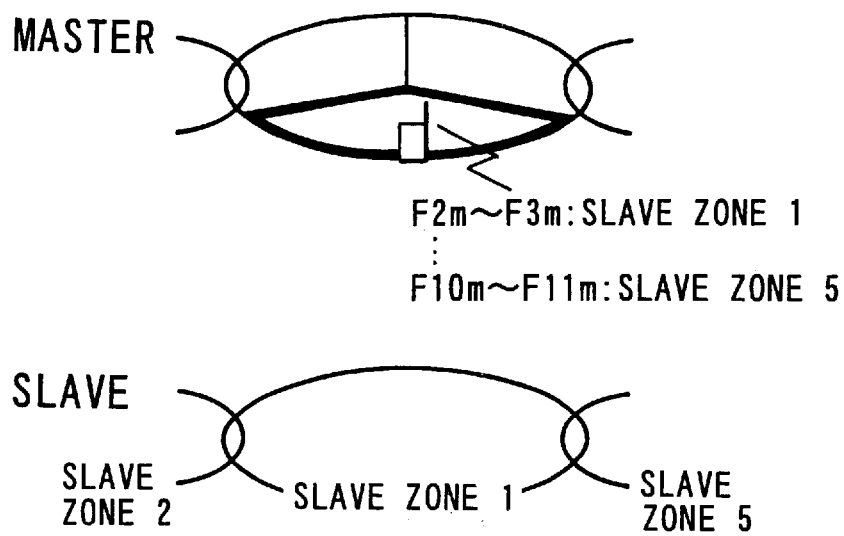
Figure 25:
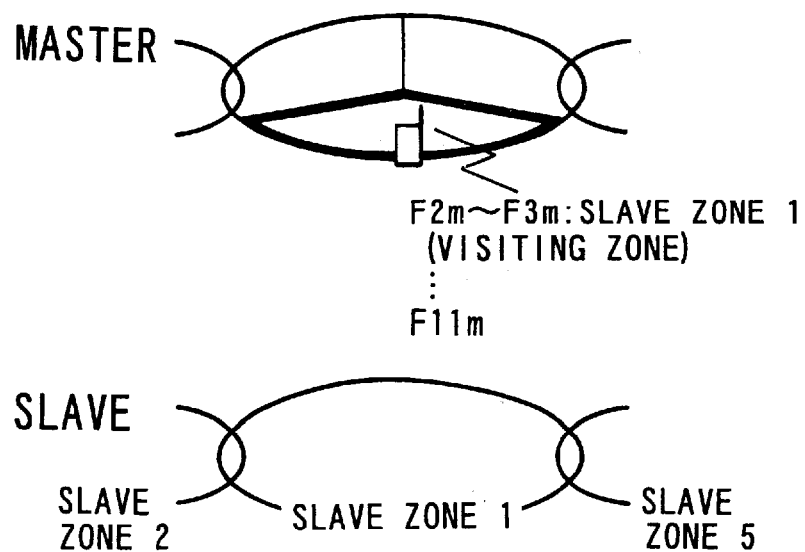

There may be various embodiments considered for informing the mobile stations of the level measuring channels F2m to F11m. For example, as shown in FIG. 23, the level measuring channels F2m to F11m can be provided without identifications representing the concerning zones in the slave system. Meanwhile, as shown in FIG. 24, signals specifying the slave zones may be provided, so as to identify at least one slave zone, with the level measuring channels F2m to F11m. Furthermore, as shown in FIG. 25, the mobile station may be informed of the level measuring channels (level measuring channels F2m and F3m in the example of FIG. 25) concerning the slave zone in which the mobile station is visiting.

Figure 26A:
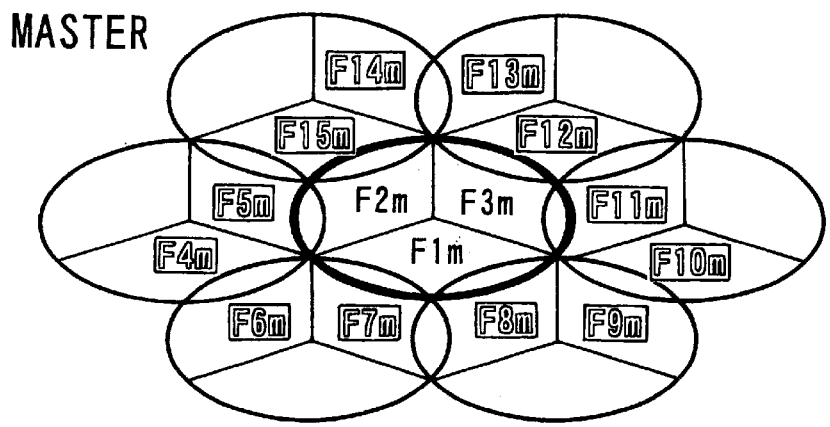
Figure 26B:
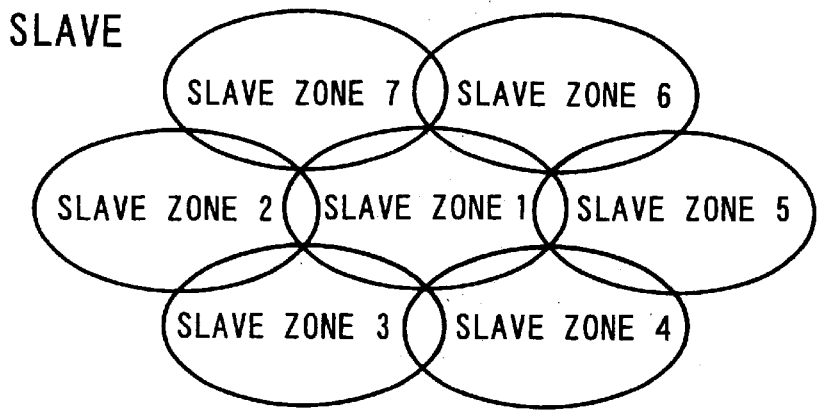
Figure 27:
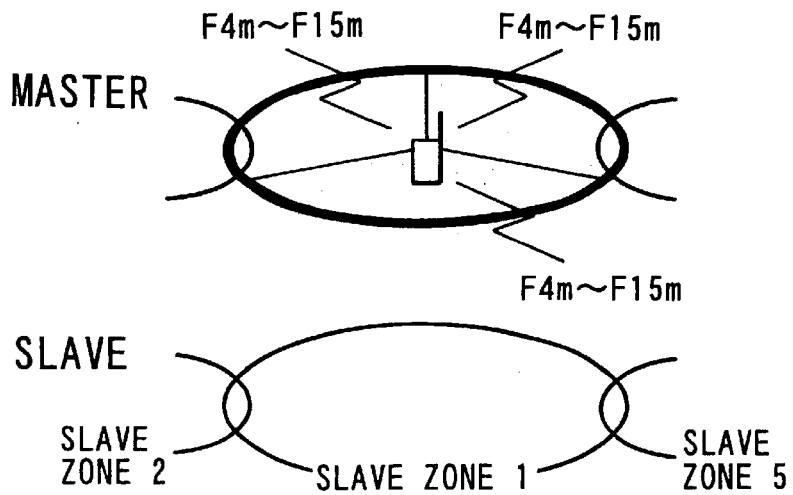

(ii-2) Zones of master system adjoining the visiting zone of slave system are supposed to be surrounding zones In FIG. 26(a), if the mobile station is visiting the master zone having the level measuring channel F1m, the mobile station also visits a "slave zone 1" in FIG. 26(b) in the slave system. Accordingly, the slave zone becomes the zones having the level measuring channels F4m to F15m. More specifically, the mobile station is informed of the level measuring channels F4m to F15m. In this situation, the mobile station may be informed of the level measuring channels F4m to F15m without specifying the slave zones concerning the level measuring channels F4m to F15m.

(ii-3) Combination of (ii-1) and (ii-2) are supposed to be surrounding zones

Figure 23A:
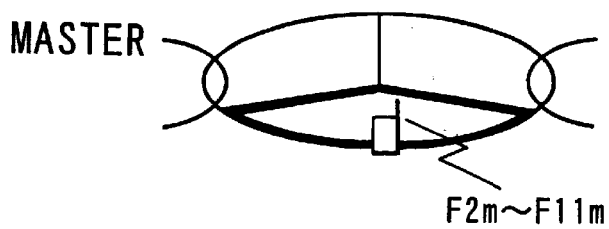
Figure 23B:
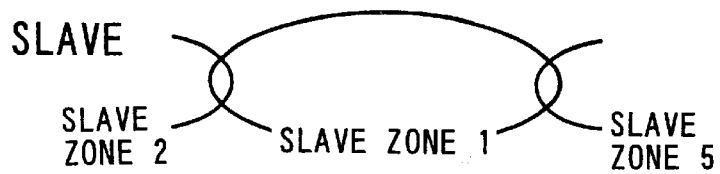
Figure 28A:
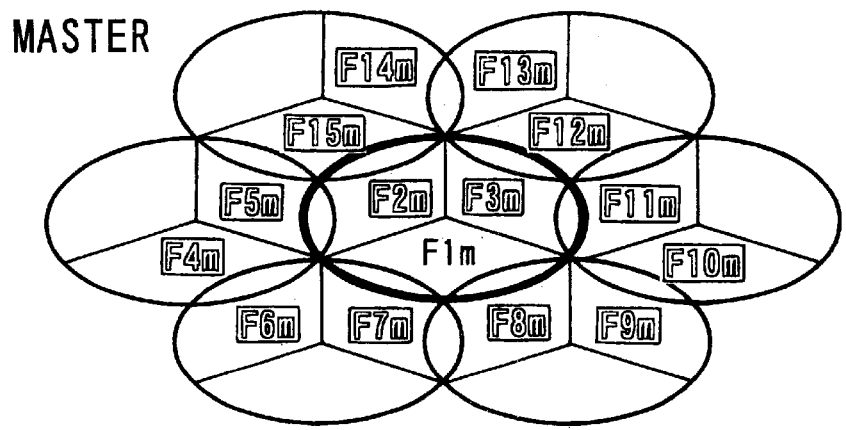
Figure 28B:
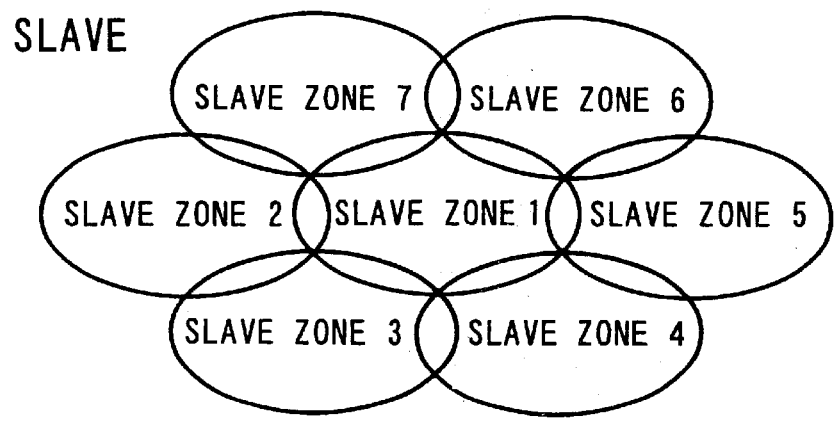
Figure 29:
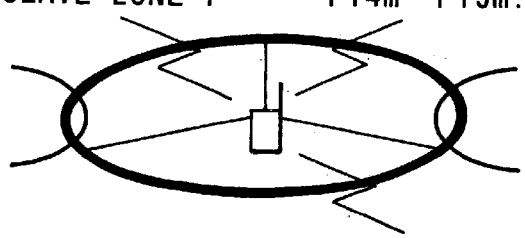
Figure 30:
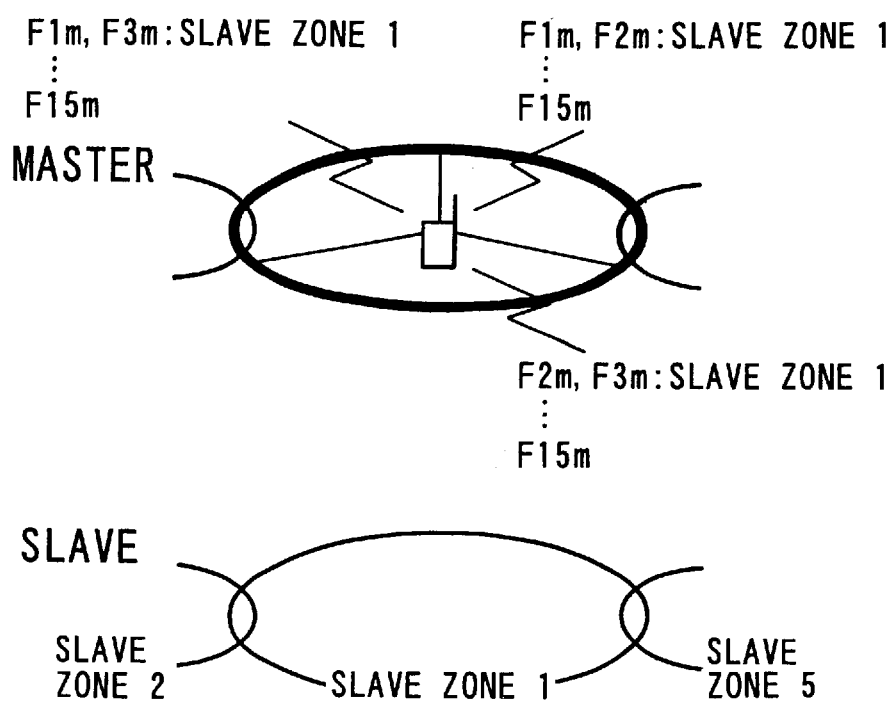
Figure 31A:
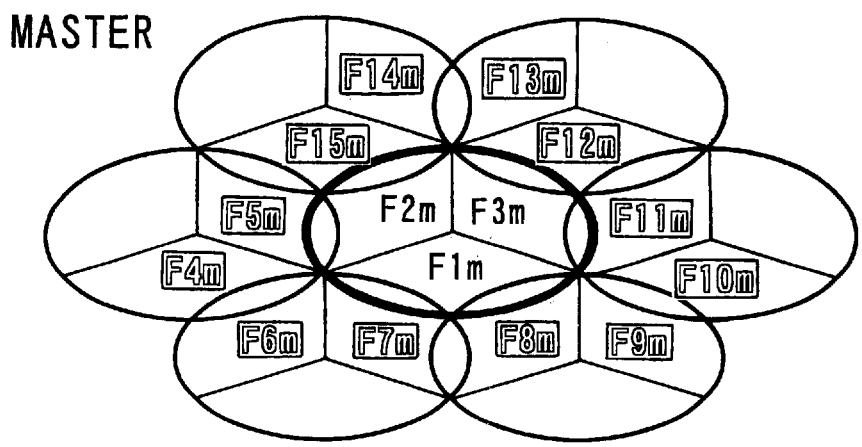
Figure 31B:
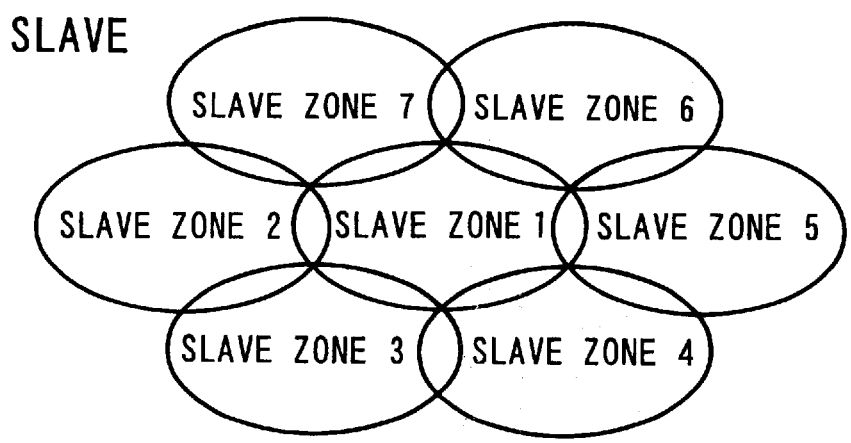

The combination of peripheral zones in FIGS. 23(a) and 26(a) may be the peripheral zones. FIG. 28(a) shows an example in such a situation. In this example, the mobile station is informed of the level measuring channels F2m to F15m of the peripheral zones accompanied with the level measuring channel F1m in the visiting zone of the mobile station. At the same time, accompanied with the level measuring channels of the peripheral zones, the mobile stations may be informed of at least one slave zone corresponding to either of the level measuring channels, as shown in FIG. 29. Furthermore, as shown in FIG. 30, the mobile station may be informed of the level measuring channels F1m to F3m, the channels corresponding to the slave zones in which the mobile station is visiting, so as to allow the mobile station to identify that the level measuring channels F1m to F3m are corresponding to the visiting slave zone.

(iii) Master system has sector-structure, slave system has omni-structure, and informations for identifying peripheral zones of master system is informed by slave system (iii-1) Zones of master system adjoining the visiting zone of slave system are supposed to be surrounding zones If the mobile station is visiting "slave zone 1", the peripheral zones of the master system are supposed to be the zones having the level measuring channels F4m to F15m. More specifically, the mobile station is informed of the level measuring channels F4m to F15m. Then, the mobile station compares the reception field levels, of any of the level measuring channels in the visiting zone (i.e., any of the level measuring channels F1m to F3m) and of the level measuring channels F2m to F11m of the peripheral zones, and executes zone switching according to the comparison results.

Figure 32:
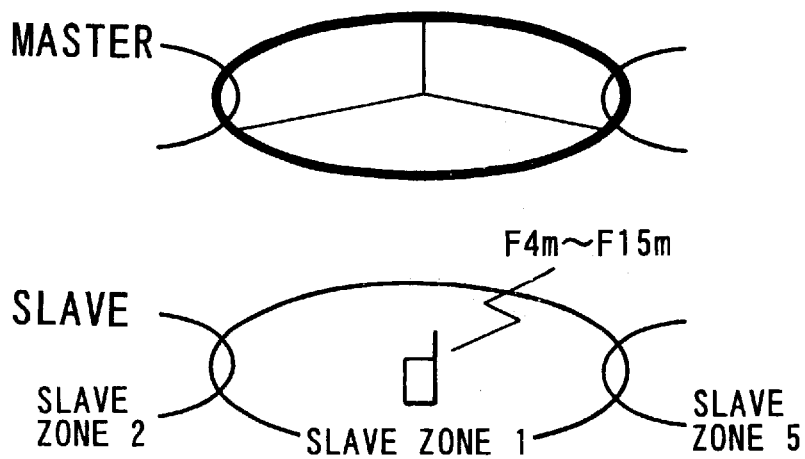

In this situation, as shown in FIG. 32, the mobile station can be informed of the level measuring channels, without specifying the slave zones concerning the level measuring channels F4m to F15m.

Figure 33A:
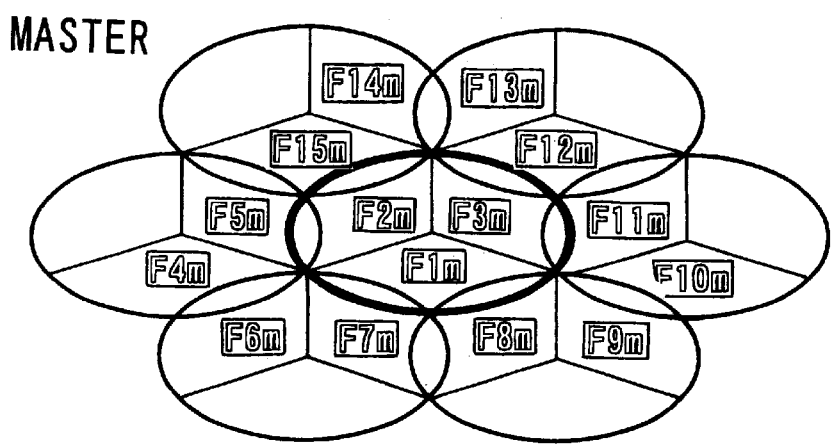
Figure 33B:
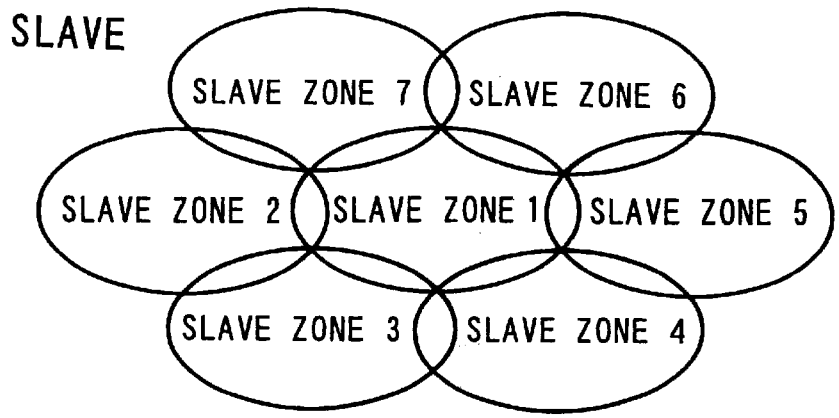
Figure 34:
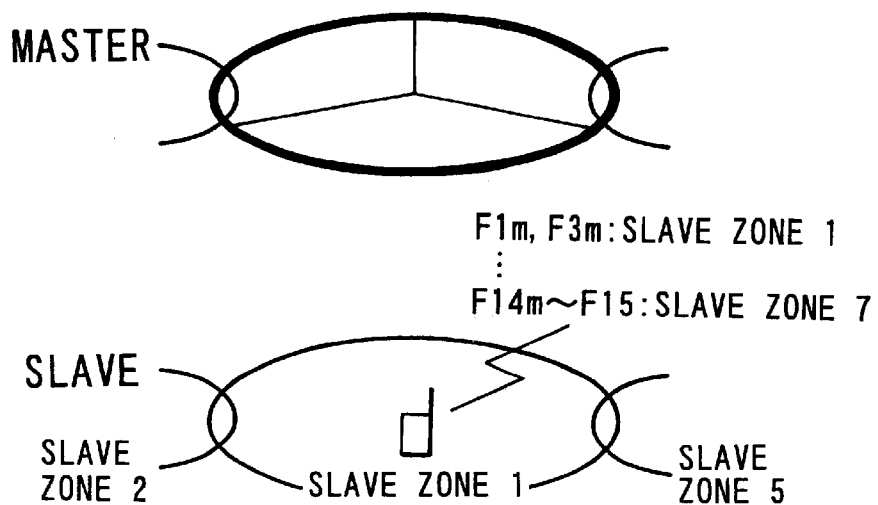
Figure 35:
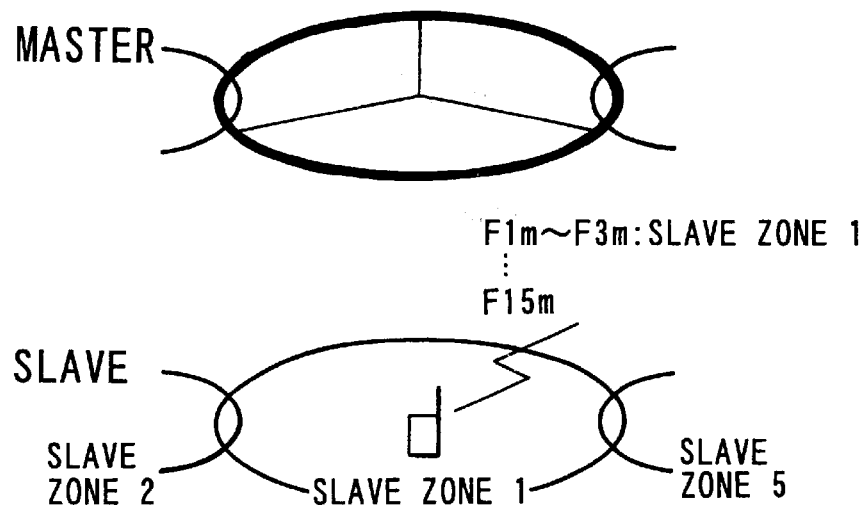

(iii-2) Zones of master system corresponding to visiting slave zone and zones of master system adjoining the visiting slave zone are supposed to be surrounding zones The zones of the master system adjoining the visiting zones of the slave system can be added to the peripheral zones. FIG. 33 shows an example of such a situation. According to the example in the drawing, the peripheral zones are supposed to be the zones having the level measuring channels F1m to F15m. At the same time, at least one slave zone may be informed to accompany the level measuring channels as shown in FIG. 34. Furthermore, as shown in FIG. 35, the mobile station may be informed of the level measuring channels F1m to F3m, the channels corresponding to the slave zone in which the mobile station is visiting.

(5) Operations of Mobile station when the power is turned on

Figure 36:
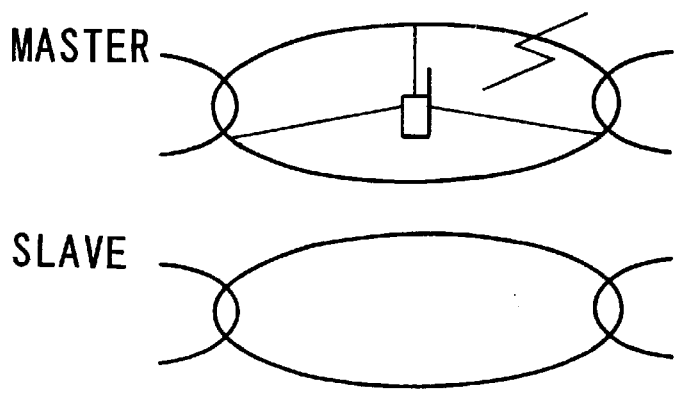
Figure 37:
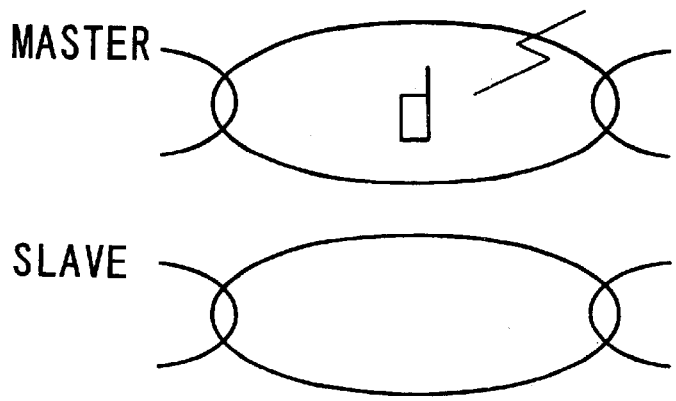

Next, description will be made for operations of the mobile station when the power is turned on. First, the mobile station communicating with the slave system stores candidates for the level measuring channel of the master system. When the power of the mobile station is turned on, the mobile station scans the channel candidates stored therein, and specifies the level measuring channel having the highest reception field level. Then, the mobile station issues a location registration request to the slave zone corresponding to the specified level measuring channel, and visits the slave zone if the request is acknowledged. Incidentally, the operation described above is applicable irrespectively of the master system, whether in the omni-structure (see FIG. 36) or in the sector-structure (see FIG. 37).

(6) Definite examples of operations of zone transfer

Premising the various protocols described above, definite examples of zone transfer of the mobile station will be described.

First, the methods of serving notice of communication requests, the methods of serving notice of the traffic channel of the home zone, the methods of serving notice of the traffic channel of the peripheral zones, and the methods of serving notice of the level measuring channel of the master system are embodied by a plurality of ways, respectively. Since the zone transfer of the mobile station is embodied by the combination of those methods, variety of examples can be considered as follows.

(i) According to the example shown in FIG. 38, the mobile station measures, on the basis of the information received from the master system, the reception field levels of the peripheral zones. Then, the mobile station receives the traffic channel from the master system of the zone transfer destination.

(ii) According to the example shown in FIG. 39, the mobile station measures, on the basis of the information received from the slave system, the reception field levels of the peripheral zones. Then, the mobile station receives the traffic channel from the master system of the zone transfer destination.

(iii) According to the example shown in FIG. 40, the mobile station measures, on the basis of the information received from the master system, the reception field levels of the peripheral zones. Then, the mobile station selects the traffic channel on the basis of the information previously received from the master system.

(iv) According to the example shown in FIG. 41, the mobile station measures, on the basis of the information received from the master system, the reception field levels of the peripheral zones. Then, the mobile station selects the traffic channel on the basis of the information previously received from the slave system.

(v) According to the example shown in FIG. 42, the mobile station measures, on the basis of the information received from the slave system, the reception field levels of the peripheral zones. Then, the mobile station selects the traffic channel on the basis of the information previously received from the master system.

(vi) According to the example shown in FIG. 43, the mobile station measures, on the basis of the information received from the slave system, the reception field levels of the peripheral zones. Then, the mobile station selects the traffic channel on the basis of the information previously received from the slave system.

(7) Method for channel selection

According to the embodiments described above, the traffic channel utilized by the mobile station is determined by the mobile station itself, so that the processing load of the fixed stations will be lightened. At the same time, it is preferable to vary the traffic channel designated by the mobile stations. Accordingly, it is preferable to determine, on the basis of numerals particular to the mobile stations (e.g., subscriber number of the mobile station or serial number), different traffic channels. For example, when the numerals peculiar to each mobile station is expressed by "I", number of the selectable traffic channels by "N", and the traffic channel selected by the mobile station among the channel list by M (where M=1, 2, . . . , N), it is preferable to determine the channel number M by following formula.

$$M = I \bmod N$$

For example, when a serial number "123456" is utilized for the number peculiar to the mobile station, the number of selectable traffic channels "N" is "5", the channel number M becomes "1", a remainder of the division "123456" by "5". Accordingly, if the frequencies f1 to f5 are enumerated sequentially in the channel list, the frequency f1 is selected to be the traffic channel.

We claim:

1. A mobile communication system comprising:
   a master system provided with a control channel for controlling a prespecified service area;
   at least one slave system for controlling the service area identical with the service area of the master system, and for utilizing the control channel;
   a mobile station for communicating with the slave system;
   a transferring means for transferring, an information required for communication between the mobile station and the slave system, via the control channel in the master system;
   further characterized in that the master system notifies the mobile station of a traffic channel of a zone of the slave system, the zone is adjoining another zone of the slave system, and the other zone is identical with the zone of the master system in which the mobile station is visiting; and
   that the mobile station selects a zone and a traffic channel to be used on the basis of the traffic channels notified.

2. A mobile communication system according to claim 1, further characterized in that the master system has a sector-structure, and the slave system has an omni-structure.

3. A mobile communication system according to claim 1, further characterized in that the master system has an omni-structure, and the slave system has a sector-structure.

4. A mobile communication system comprising:
   a master system provided with a control channel for controlling a prespecified service area, wherein the control channel is a level measuring channel;
   a mobile station for measuring a reception field level of the control channel so as to judge a zone to be visited;
   at least one slave system for controlling the service area identical with the service area of the master system, and for utilizing the control channel;
   further characterized in that the master system comprises means for notifying the mobile stations of information specifying level measuring channels of peripheral zones located in the periphery of the prespecified service area in the master system;
   and that the mobile station comprises means for measuring reception field level of the level measuring channel in the master system when the mobile station communicates within the slave system.

5. A mobile communication system according to claim 4, wherein the master system has a sector-structure and the slave system has an omni-structure, the master system further comprising:
   means for notifying the mobile station of the level measuring channel of the zone of the master system, the zone adjoining another zone of the master system in which the mobile station is visiting.

6. A mobile communication system according to claim 5, the master system further comprising:
   means for notifying, of an information together with the level measuring channel, the information concerning at least one zone in the slave system and identifying the fact that the level measuring channel is included in the zone.

7. A mobile communication system according to claim 5, the master system further comprising:
   means for notifying, of an information together with the level measuring channel, the information concerning a zone in which the mobile station is visiting, and the information identifying the fact that the level measuring channel is included in the zone.

8. A mobile communication system according to claim 4, wherein the master system has a sector-structure and the slave system has an omni-structure, the master system further comprising:
   means for notifying the mobile station of the level measuring channel of the zone of the master system, the zone adjoining another zone of the slave system in which the mobile station is visiting.

9. A mobile communication system according to claim 8, wherein the master system further comprising:
   means for notifying the mobile station of other level measuring channels together with the level measuring channel of which the mobile station is notified, wherein the other level measuring channels are provided in a zone of the slave system, the zone in which the mobile station is visiting; and means for notifying, of an information concerning at least one of the level measuring channels and identifying corresponding zone in the slave system.

10. A mobile communication system according to claim 9, further characterized in that the zone the mobile station being notified of is provided in the slave system, and is visited by the mobile station.

11. A mobile communication system comprising:

a master system provided with a control channel for controlling a prespecified service area, wherein the control channel is a level measuring channel;

a mobile station for measuring a reception field level of the control channel so as to judge a zone to be visited;

at least one slave system for controlling the service area identical with the service area of the master system, and for utilizing the control channel;

further characterized in that the slave system comprises means for notifying the mobile stations of information specifying channels of peripheral zones located in the periphery of the prespecified service area in the master system;

and that the mobile station comprises means for measuring reception field level of the level measuring channel in the master system when the mobile station communicates within the slave system.

12. A mobile communication system according to claim 11, wherein the master system has a sector-structure and the slave system has an omni-structure, the slave system further comprising:

means for notifying the mobile station, of the level measuring channel of the zone of the master system, the zone adjoining another zone of the slave system in which the mobile station is visiting.

13. A mobile communication system according to claim 12, wherein the slave system further comprising:

means for notifying the mobile station, of other level measuring channels together with the level measuring channel of which the mobile station is to be notified, wherein the other level measuring channels are provided in a zone of the slave system, the zone in which the mobile station is visiting; and means for notifying of an information concerning at least one of the level measuring channels and identifying a corresponding zone in the slave system.

14. A mobile communication system according to claim 13, further characterized in that the zone of which the mobile station is to be notified is provided in the slave system, and that the zone is visited by the mobile station.

15. A mobile communication system according to claim 11, further characterized in that the slave system notifies the mobile station of the traffic channels in the peripheral zones.

* * * * *